(12) United States Patent
Cavalca et al.

(10) Patent No.: US 6,287,717 B1
(45) Date of Patent: Sep. 11, 2001

(54) FUEL CELL MEMBRANE ELECTRODE ASSEMBLIES WITH IMPROVED POWER OUTPUTS

(75) Inventors: Carlos A. Cavalca, Newark, DE (US); James H. Arps, San Antonio, TX (US)

(73) Assignee: Gore Enterprise Holdings, Inc., Newark, DE (US)

( * ) Notice: Subject to any disclaimer, the term of this patent is extended or adjusted under 35 U.S.C. 154(b) by 0 days.

(21) Appl. No.: 09/190,215

(22) Filed: Nov. 13, 1998

(51) Int. Cl.[7] ............................. H01M 4/86; H01M 4/90; H01M 4/96
(52) U.S. Cl. ................................. 429/40; 429/41
(58) Field of Search .................. 429/40, 41; 209/192.12

(56) References Cited

U.S. PATENT DOCUMENTS

| | | |
|---|---|---|
| 3,274,029 | 9/1966 | Lurie et al. . |
| 3,492,163 | 1/1970 | Hilmer . |
| 3,615,948 | 10/1971 | Krostewitz . |
| 3,730,774 | 5/1973 | McKee et al. . |
| 3,953,566 | 4/1976 | Gore . |
| 4,160,856 | 7/1979 | Warszawski . |
| 4,311,567 | 1/1982 | White . |
| 4,430,391 | 2/1984 | Ovshinsky et al. . |
| 4,433,082 | 2/1984 | Grot . |
| 4,487,818 | 12/1984 | Ovshinsky et al. . |
| 4,528,083 | 7/1985 | LaConti et al. . |
| 4,547,437 | 10/1985 | Isenberg et al. . |
| 4,686,158 | 8/1987 | Nishi et al. . |
| 4,738,904 | 4/1988 | Ludwig et al. . |
| 4,826,741 | 5/1989 | Aldhart et al. . |
| 4,876,115 | 10/1989 | Raistrick . |
| 4,931,152 | 6/1990 | Naik et al. . |
| 4,937,152 | 6/1990 | Sato et al. . |
| 5,041,195 | 8/1991 | Taylor et al. . |
| 5,068,126 | 11/1991 | Suzuki et al. . |
| 5,133,842 | 7/1992 | Taylor et al. . |

(List continued on next page.)

FOREIGN PATENT DOCUMENTS

| | | |
|---|---|---|
| WO 99/13128 | 3/1999 | (WO) . |
| WO 99/16137 | 4/1999 | (WO) . |

OTHER PUBLICATIONS

K. Kinoshita, "Fuel Cells", *Encyclopedia of Chem. Tech.*, 4th Ed., vol. 11, pp. 1098–1121.

S. Srinivasan, et al.; "Recent Advances in Solid Polymer Electrolyte Fuel Cell Technology with Low Platinum Loading Electrodes", *J. Power Sources;* 29 (1990); pp. 367–387.

J. Poirier, G. Stoner; "Microstructural Effects on Electrocatalytic Oxgen Reduction Activity of Nano–Grained Thin––film Platinum in Acid Media", *J. Electrochem. Soc.*, vol. 141, No. 2, Feb. 1994, pp. 425–430.

E. Ticianelli, et al., "Localization of platinum in low catalyst loading electrodes to attain high power densities in SPE fuel cells", *J. Electroanalytical Chem Interfacial Electrochem*, vol. 251, No. 2, Sep. 23, 1988, pp. 275–295.

S. Hirano, et al; "High performance proton exchange membrane fuel cells with sputter–deposited Pt layer electrodes" *Electrochimica Acta*, vol. 42, No. 10, 00. 1587–1593 (1997).

*Primary Examiner*—Stephen Kalafut
*Assistant Examiner*—Julian A. Mercado
(74) *Attorney, Agent, or Firm*—Morgan & Finnegan, L.L.P.

(57) ABSTRACT

An electrode-membrane combination for use in a fuel cell comprising at least one reactant diffusive, electronically conductive electrode comprising at least one first catalytically active metal and at least one ionically conductive polymer; and at least one ionically conductive membrane contacting the electrode to form an electrode-membrane interfacial region, wherein the interfacial region comprises at least one zone comprising at least one second catalytically active metal and having a zone thickness of about 3 angstroms to about 475 angstroms. Surprisingly improved power output is observed. The zone is preferably deposited by electron beam physical vapor deposition. Substantially spherical nodules are observed for the zone from field-emission SEM analysis.

144 Claims, 16 Drawing Sheets

U.S. PATENT DOCUMENTS

| | | |
|---|---|---|
| 5,151,334 | 9/1992 | Fushimi et al. . |
| 5,183,713 | 2/1993 | Kunz . |
| 5,192,523 | 3/1993 | Wu et al. . |
| 5,208,112 | 5/1993 | Ludwig et al. . |
| 5,211,984 | 5/1993 | Wilson . |
| 5,234,777 | 8/1993 | Wilson . |
| 5,296,274 | 3/1994 | Movchan et al. . |
| 5,338,430 | 8/1994 | Parsonage et al. . |
| 5,340,665 | 8/1994 | Khandkar . |
| 5,350,643 | 9/1994 | Imahashi et al. . |
| 5,395,704 | 3/1995 | Barnett et al. . |
| 5,500,292 | 3/1996 | Muranaka et al. . |
| 5,509,189 | 4/1996 | Tuller et al. . |
| 5,547,551 | 8/1996 | Bahar et al. . |
| 5,561,000 | 10/1996 | Dirven et al. . |
| 5,599,614 | 2/1997 | Bahar et al. . |
| 5,624,718 | 4/1997 | Dearnaley . |
| 5,635,041 | 6/1997 | Bahar et al. . |
| 5,686,199 | 11/1997 | Cavalca et al. . |
| 5,750,013 | 5/1998 | Lin . |
| 5,786,026 | 7/1998 | Seko et al. . |
| 5,795,672 | 8/1998 | Dearnaley . |
| 5,879,827 | 3/1999 | Debe et al. . |
| 5,879,828 | 3/1999 | Debe et al. . |

OTHER PUBLICATIONS

S. Mukerjee, et al.; "Effect of Sputtered Film of Platinum on Low Platinum Loading Electrodes on Electrode Kinetics of Oxygen Reduction in Proton Exchange Membrane Fuel Cells", *Electrochimica Acta*, vol. 38, No. 12, (1993) pp. 1661–1669.

Weber, et al; "Sputtered Fuel Cell Electrodes", *J. Electrochem. Soc.*, Jun. 1987, pp. 1416–1419.

M. Morita, et al; "Anodic Oxidation of Methanol at A Gold–Modified Platinum Electrocatalyst Prepared by RF Sputtering on a Glassy Carbon Support", *Electrochimica Acta*, vol. 36, No. 5/6, (1991) pp. 947–951.

E. Taylor, et al, "Preparation of High–Platinum–Utilization Gas Diffusion Electrodes for Proton–Exchange–Membrane Fuel Cells" *J. Electrochem. Soc.*, vol. 139, No. 5, May 1992.

"Effect of Sputtered Film of Platinum on Low Patinum Loading Electrodes on Electrode Kinetics of Oxygen Reduction in Proton Exchange Membrane Fuel Cells," Sanjeev Mukerjee, Supramaniam Srinivasan and A. John Appleby, in Electrochimica Acta, vol. 38,(1993) Aug., No. 12, pp. 1661–1993.

125:15160a High performance PEFCs with sputter–deposited Pt layer on low–Pt–loading electrode. Hirano, Sinichi; Fujikawa, Futoshi. Chemical Abstracts, vol. 125 (1996), Jul. 8, No. 2. P. 84.

"Localization of platinum in low catalyst loading electrodes to attain high power densities in SPE fuel cells," by Edson Ticianelli, Charles Derouin and Supramaniam Srinivasan, in J. Electroanal. Chem. 251 (1988) 275–295, Elsevier Sequoia S.A., Lausanne—Printed in the Netherlands.

"Alternate Methods for Platinum Localization in Electrodes to Attain High Power Densities in Solid Polymer Electrolyte Fuel Cells," by M. A. Enayetullah, E. A. Ticianelli, D.J. Manko, S. Srinivasan, and A. J. Appleby, 1046b Extended Abstracts, Spring Meeting, Los Angeles, CA, May 7–12, 1989, 89/1, Princeton, NJ.

"Carbon Monoxide Tolerant Anodes for Proton Exchange Membrane (PEM) Fuel Cells. I. Catalyst Development Approach", Holleck et al. Engineering Conference on Energy Conversion, Colorado Springs, Co., Aug. 2–6, 1998, pp. 1–6.

Fuel Cell Systems, L.J.M.J. Blomwn and M.N. Mugerwa (Ed.); Plenum Press; 1993; Chapter 11., P. 493–530.

FUEL CELL MEMBRANE ELECTRODE ASSEMBLIES WITH IMPROVED POWER OUTPUTS

FIELD OF THE INVENTION

This invention relates generally to fuel cell membrane electrode assemblies with improved power outputs. More particularly, these improved assemblies feature a relatively thin zone of catalytically active metal at the membrane-electrode interface in addition to catalytically active metal in the electrode.

BACKGROUND OF THE INVENTION

Fuel cells continue to show great commercial promise throughout the world as an alternative to conventional energy sources. This commercial promise should continue to grow as energy shortages become more acute, environmental regulations become more stringent, and new fuel cell applications emerge. See "FUEL CELLS", *Encyclopedia of Chemical Technology,* 4th Ed., Vol. 11, pp. 1098–1121.

Despite improvements in fuel cell technology, however, long felt needs exist to increase power output, reduce initial cost, improve water management, and lengthen operational lifetime. Initial cost reduction can be most easily achieved by reducing the precious metal content of the fuel cell electrode. Such reduction, however, generally results in power output loss which blocks commercialization efforts.

There are different types of fuel cells, but they each produce electrical energy by means of chemical reaction. One type of increasing import, the "polymer electrolyte membrane fuel cell" (PEMFC), comprises a membrane electrode assembly (MEA) typically made of an ionically conducting polymeric membrane sandwiched between two electronically conducting electrodes. For commercial application, multiple MEAs can be electronically connected to form a fuel cell stack (i.e., "stacked"). Other components associated with typical PEMFCs include gas diffusion media and current collectors, the latter of which can also serve as bipolar separators and flow field elements. PEMFCs have been reviewed in the literature. See S. Srinivasan et al.; *J. Power Sources;* 29 (1990); pp. 367–387.

In a typical PEMFC, a fuel such as hydrogen gas is electrocatalytically oxidized at one electrode (anode). At a the other electrode (cathode), an oxidizer such as oxygen gas is electrocatalytically reduced. The net reaction results in generation of electromotive force. Elevated temperature can accelerate this reaction, although one increasingly important advantage of the PEMFC is that lower temperatures (e.g., 80° C.) can be used. The fuel cell reactions are generally catalyzed by precious transition metal, commonly a noble metal such as platinum, which is present in both anode and cathode. Because the fuel cell is often operated with use of gaseous reactants, typical electrodes are porous materials (more generally, reactant diffusive materials) having the catalytically active metal at the porous surfaces. The metal can be in different morphological forms, but often it is in particulate or dispersed form and supported on carbon. Fuel cell performance may depend on the form of catalyst. See Poirier et al.; *J. Electrochemical Society,* vol. 141, no. 2, February 1994, pp. 425–430.

Fuel cell systems are complex because the reaction is believed localized at a three-phase boundary between ionically conducting membrane, gas, and carbon supported catalyst. Because of this localization, addition of ionically conductive material to the electrode can result in better utilization of catalyst as well as improved interfacial contact with the membrane. However, the additional ionic conductor can introduce extra cost, especially when perfluorinated conductors are used, and can increase the complexity of electrolyte water management, all important to commercialization.

One general approach to minimize loading of expensive catalytic metal has been to use smaller catalyst particles. However, long operational lifetimes are particularly difficult to achieve with low catalyst loadings. Also, catalyst particle size may be unstable and increase by agglomeration or sintering.

Another approach has been to concentrate the metal at the membrane-electrode interface. See Ticianelli et al.; *Journal of Electroanalytical Chemistry and Interfacial Electrochemistry;* Vol. 251 No. 2, Sep. 23, 1988, pp. 275–295. For example, 500 angstrom dense layers of metal catalyst reportedly have been sputtered onto certain gas diffusion electrodes before sandwiching the ionically conducting membrane between the electrodes. Apparently, however, sputtered layers thinner than 500 angstroms have not been reported, possibly because of the difficulty in making uniform thinner layers. Moreover, other types of electrodes and deposition techniques may not be suitable, water balance may be upset, and testing often is not carried out under commercial conditions. In sum, it is recognized that mere depositing a thin layer of catalyst onto the electrode does not guarantee a suitable MEA. According to the Srinivasan article noted above, sputtering may not be economically feasible compared with wet chemical deposition methods. Thus, in general, industry has not accepted this approach as realistic.

Additional technology is described in the patent literature including, for example, U.S. Pat. Nos. 3,274,029; 3,492,163; 3,615,948; 3,730,774; 4,160,856; 4,547,437; 4,686,158; 4,738,904; 4,826,741; 4,876,115; 4,937,152; 5,151,334; 5,208,112; 5,234,777; 5,338,430; 5,340,665; 5,500,292; 5,509,189; 5,624,718; 5,686,199; and 5,795,672. In addition, deposition technology is described in, for example, U.S. Pat. Nos. 4,931,152; 5,068,126; 5,192,523; and 5,296,274.

SUMMARY OF THE INVENTION

Despite the prejudices existing in the art, the inventors have discovered that surprisingly high improvements in power output can be achieved for low and ultra-low catalyst MEAs. By introducing a relatively thin zone of catalytic metal at the interface between selected electrodes and membranes, significantly more power can be produced for the same amount, or even less amounts, of catalyst. Moreover, by combining selected electrodes and membranes, superior overall fuel cell performance can be achieved. The test results, significantly, are promising even under commercially realistic conditions.

In particular, the inventors have discovered an electrode-membrane combination comprising at least one reactant diffusive, electronically conductive electrode comprising at least one first catalytically active metal and at least one ionically conductive polymer; and at least one ionically conductive membrane contacting the electrode to form an electrode-membrane interfacial region, wherein the interfacial region comprises at least one zone comprising at least one second catalytically active metal and having a zone thickness of about 3 angstroms to about 475 angstroms.

Another aspect of this invention is an electrode-membrane combination comprising at least one electronically conducting electrode comprising at least one first catalytically active metal and at least one ionically conductive polymer; and at least one ionically conducting membrane contacting the electrode to form an electrode-membrane interfacial region, wherein the interfacial region comprises a vacuum deposited zone comprising at least one second catalytically active metal.

A further aspect of this invention is an electrode-membrane combination comprising at least one reactant diffusive, electronically conducting electrode comprising (i) eat least one first catalytically active metal dispersed throughout the electrode; (ii) at least one tonically conductive polymer, and (iii) a vacuum deposited zone comprising at least one second catalytically active metal; an ionically conducting membrane contacting the electrode to form an electrode-membrane interface, wherein the zone of at least one second catalytically active metal is concentrated in the electrode at the electrode-membrane interface.

Another aspect is an article comprising at least one reactant diffusive, electronically conductive electrode comprising at least one first catalytically active metal and at least one ionically conductive polymer; and at least one ionically conductive membrane contacting the electrode to form an electrode-membrane interfacial region, wherein the interfacial region comprises at least one zone comprising at least one second catalytically active metal and having a zone loading of about 0.0006 mg/cm$^2$ to about 0.12 mg/cm$^2$.

Moreover, the invention includes an electrode-membrane combination comprising at least one reactant diffusive, electronically conductive electrode comprising at least one first catalytically active metal and at least one ionically conductive polymer; and at least one ionically conductive membrane contacting the electrode to form an electrode-membrane interfacial region, wherein the interfacial region comprises at least one zone comprising at least one second catalytically active metal having a form including substantially spherical nodules.

Another aspect, moreover, is a membrane electrode assembly comprising the combination of first and second reactant diffusive, electronically conducting electrodes, and at least one ionically conducting membrane sandwiched between and contacting the first and second electrodes to form first and a second membrane-electrode interfacial regions, respectively, wherein the first and second electrodes each comprise at least one ionically conductive polymer and at least one catalytically active first metal, and wherein at least one of the two interfacial regions comprises a zone of at least one catalytically active second metal having a zone loading between about 0.0006 mg/cm$^2$ and about 0.12 mg/cm$^2$.

The inventors have also discovered a membrane electrode assembly comprising the combination of first and second reactant diffusive, electronically conducting electrodes, and at least one ionically conducting membrane sandwiched between and contacting the first and second electrodes to form first and a second membrane-electrode interfacial regions, respectively, wherein the first and second electrodes each comprise ionically conductive polymer and at least one catalytically active first metal, and wherein at least one of the two interfacial regions comprise a zone of catalytically active second metal having a form including substantially spherical nodules.

Other aspects of the invention include fuel cell stacks and transportation vehicles comprising the combinations and assemblies according to the invention.

Finally, the invention also includes a method of improving the power output of a fuel cell membrane electrode assembly comprising the combination of steps of providing assembly elements including (i) at least one reactant diffusive, electronically conductive electrode comprising at least one ionically conductive polymer and at least one first catalytically active metal dispersed throughout the electrode, and (ii) at least one ionically conductive membrane; depositing onto at least one of the assembly elements a zone of at least one second catalytically active metal having a zone thickness between about 3 angstroms and about 475 angstroms, wherein the zone deposition is (i) a direct deposition onto the assembly element, or (ii) an indirect deposition onto the assembly element wherein the deposited zone is first deposited onto a substrate and then transferred from the substrate onto the assembly element, and optionally assembling the membrane electrode assembly from the assembly elements.

In addition to improved power output with better catalyst utilization, a further important advantage is that multiple methods can be used to prepare the structures, and that these multiple methods can be tailored to different commercial applications. More precise design and control is now possible. Also noteworthy are that the zone of catalyst metal does not substantially upset the water balance of the fuel cell system, that the invention can be applied to different fuel cell reactants, and that process scalability has been demonstrated. In sum, the invention is commercially realistic.

DETAILED DESCRIPTION OF THE INVENTION

Figure 1:
FIG. 1 is a cross-sectional view of an MEA according to the invention comprising an ionically conducting membrane sandwiched between two electronically conducting electrodes and forming two interfacial regions.
Figure 1:
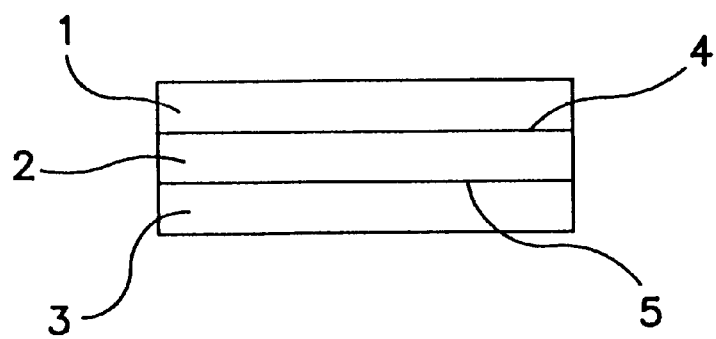

FIG. 1 illustrates a cross-section of a planar geometry MEA according to this invention. The z-direction is shown coplanar with the page and perpendicular to the plane of the MEA. Components 1 and 3 represent electronically conductive electrodes (first and second electrodes) which each contact and together sandwich an ionically conductive polymeric membrane 2. The electrodes includes catalytically active metal. Regions 4 and 5 represent first and second interfacial regions. The regions separate the membrane 2 from the first and second electrodes (1 and 3). The MEA comprises two half cells formed by combination of electrode 1 and membrane 2 (without electrode 3) or by combination of electrode 3 and membrane 2 (without electrode 1).

Figure 2:
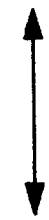
FIG. 2 is a cross-sectional view of a half cell according to the invention including an ionically conductive membrane contacting an electronically conductive electrode to form a membrane-electrode interfacial region. A zone of catalytically active metal is also present.
Figure 2:
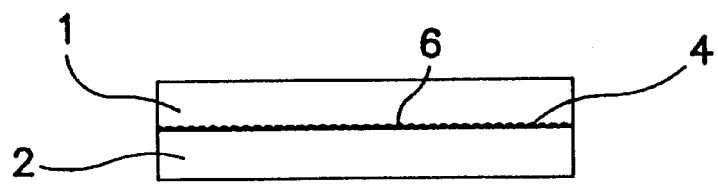

FIG. 2 illustrates a half cell according to this invention comprising the first electrode 1 and the ionically conductive membrane 2 which together contact and form interfacial region 4. The extent of the interfacial region can depend on, for example, (i) the method by which the membrane and electrode are brought into contact, and (ii) the surface roughness and porosity of the membrane and electrode. Irrespective of how the half cell is formed, however, this interfacial region comprises a zone 6 of catalytically active metal which optionally is the same catalytically active metal present in the electrode (a first metal). However, the catalytically active metal of zone 6 (a second metal) can be deposited in a separate step from catalytically active metal in electrode 1. The second metal can be a different metal entirely from the first metal, or it can be the same metal but have a different structure or morphology. Mixtures of metals can be used so that, for example, the zone 6 comprises at least two different second catalytically active metals or the electrode comprises at least two different first catalytically active metals.

Figure 3:
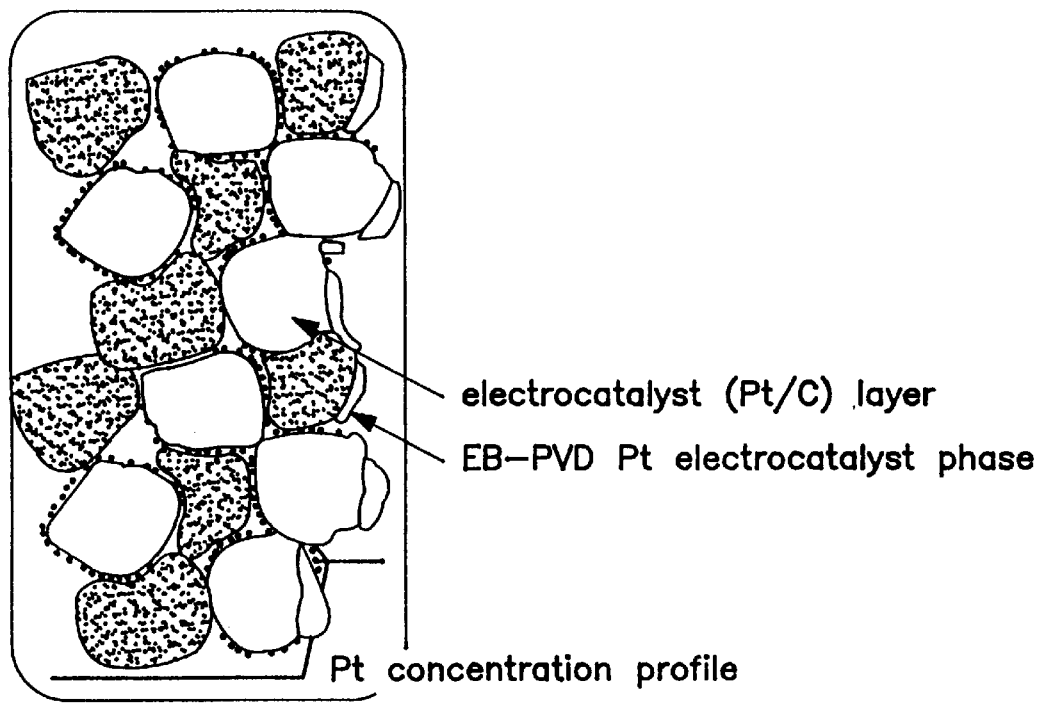
FIG. 3 is a representation of the z-gradient of catalytically active metal for one embodiment of the invention. The cross-sectional view of the electrode shows catalytically active metal vacuum deposited directly onto the electrode.

FIG. 3 illustrates by means of a cross-sectional view of an electrode a preferred embodiment of this invention (see Example 2 below). The electrode comprises ionically conducting perfluorinated ionomer fused with particles of carbon supported platinum catalyst. In addition, the electrode comprises a vacuum deposited zone of platinum which helps form a z-gradient step function of catalytically active metal.

Figure 4:
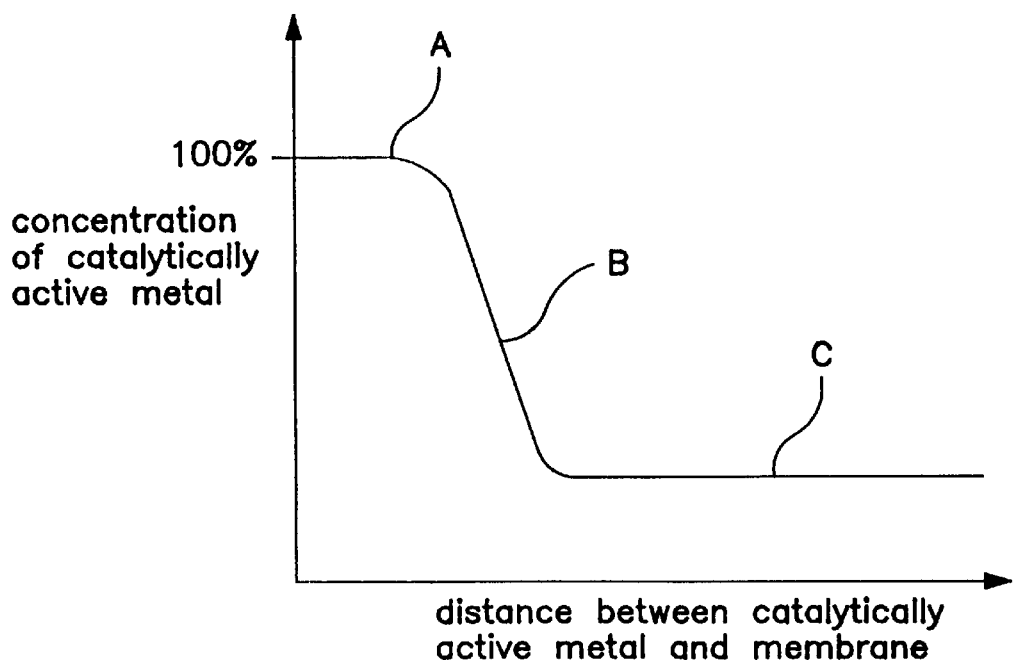
FIG. 4 further represents the concept of the z-gradient, step function according to the invention.

FIG. 4 further represents the z-gradient step function concept of this invention. In this representation, concentration of catalytically active metal in the electrode is shown as a function of distance from the membrane. The catalytically active metal can be either metal which is present originally in the electrode (i.e., a first metal) or metal which is deposited separately (i.e., a second metal). Initially, in region A, the catalytically active metal is entirely or substantially the second metal, and the electrode is substantially pure metal free from carbon or ionically conductive polymer. Then, a region B exists wherein the concentration of second metal drops. The slope in region B can vary depending on, for example, surface roughness, electrode porosity, homogeneity, preparation method, and other experimental factors. The slope can include a linear or substantially linear portion. Finally, a region C exists wherein the concentration of catalytically active metal is due to the first metal originally present in the electrode before deposition of the second. If desired, region C can include a gradient in concentration of first catalytically active metal with higher concentrations toward the membrane.

Both the first catalytically active metal and the second catalytically active metal can be present in mixtures of catalytically active metals without change in this concept of a z-gradient step function shown in FIG. 4. If metal mixtures are present, then the concentrations of each metal would be added to yield the total concentration.

Although the theory of the present invention is not fully understood, it is believed that an unexpected synergistic interaction can occur between the first catalytically active metal and the zone of deposited second catalytically active metal. As a result, significant power increases can be observed without substantial increase in metal loading, particularly when selected deposition methods are used.

This invention is widely applicable in fuel cell technology, particularly PEMFC technology. The fuel is preferably a gas such as hydrogen, but liquid fuels such as alcohols, including methanol, can also be used. Hydrocarbons including reformed gasoline or diesel fuel can also be used to provide fuel.

When reformate fuel is used, a plurality of catalytically active metals (e.g., bimetallic) can be used to improve performance and reduce poisoning effects. In particular, carbon monoxide poisoning can be a problem even at levels as low as 5–100 ppm of carbon monoxide. For example, in this embodiment, the interfacial region can comprise at least two of the second catalytically active metals different from each other. Also, the electrode can comprise at least two of the first catalytically active metals different from each other. In this embodiment, the plurality of catalytically active metals is preferably at the anode. The plurality of metals can include three, four, and even more different metals if desired. Metal alloying preferably occurs. For bimetallic systems, preferred combinations include Pt—Ru, Pt—Sn, Pt—Co, and Pt—Cr, and the most preferred combination is Pt—Ru. Preferably, substantially equal amounts of each metal are present. Hence, a bimetallic combination is preferably a 50/50 mixture or alloy.

The reactant diffusive, electronically conductive electrodes, including cathode and anode, can be prefabricated before they are contacted with the tonically conductive membrane or subjected to the deposition of the second catalytically active metal. In general, conventional gas diffusion electrodes are commercially available and can be used either directly or with modification. For example, low platinum loading electrodes can be obtained from E-TEK, Inc. (Natick, Mass.) or from Electrochem, Inc.

Electrodes should comprise components which provide structural integrity, effective water management, diffusivity to reactants including porosity or diffusivity to gases, electronic conductivity, catalytic activity, processability, and good interfacial contact with the membrane. The structure of the electrode is not particularly limited provided that these functional attributes are present. At least one ionically conductive polymer should be present as part of the electrode to increase catalyst utilization.

The electrodes generally can be of substantially planar geometry. Planar means an article or form made so as to have length and width dimensions, or radial dimensions, much greater than the thickness dimension. Examples of such articles include polymeric films or membranes, paper sheets, and textile fabrics. Once formed, such planar articles can be used as an essentially flat article, or wound, folded, or twisted into more complex configurations.

The electrodes are at least partially porous, wherein porous means a structure of interconnected pores or voids such that continuous passages and pathways throughout a material are provided. More generally, the electrode should allow reactants to diffuse through the electrode at commercially usable rates.

Electrode preparation and other aspects of fuel cell technology are described in, for example, U.S. Pat. Nos. 5,211,984 and 5,234,777 to Wilson, which are hereby incorporated by reference. For example, Wilson teaches use of catalyst-containing inks and transfer methods to fabricate electrodes comprising ionically conductive polymer and metal catalyst. In these patents, an uncatalyzed porous electrode is placed against a film of catalyst during fuel cell assembly to form a gas diffusion backing for the catalyst film. However, the catalyst films in Wilson, unlike those of this invention, have little if any porosity.

Preferred electrodes are formed of electrically conductive particulate materials, which may include catalyst materials, held together by a polymeric binder. If desired, hydrophobic binders such as polytetrafluoroethylene can be used. Ion exchange resin can be used as binder. Expanded or porous polytetrafluoroethylene can be used. In particular, a preferred electrode can be prepared by the following procedure ("procedure A"):

A dispersion of 5 g of carbon black-platinum (50 wt. %) particles (from NE Chemcat Co.) in 40 g 2-methyl-1-propyl alcohol is prepared. To the dispersion is added a liquid composition of isopropyl alcohol containing 9 wt. % Nafion® perfluorosulfonic acid resin (DuPont) and thoroughly mixed, with the aid of ultrasonic agitation, to form a liquid mixture, having a relative concentration of 50 wt. % ion exchange resin and 50 wt. % carbon black supported platinum. The liquid mixture is painted by brush to impregnate a porous expanded polytetrafluoroethylene electrode-support film (thickness—16 micrometers; pore volume 94%; IBP 0.12 kg/cm$^2$). Solvent is removed by air drying. The composite structure is heat treated at 120° C. for 24 hours to complete the procedure.

This procedure A also can be carried out, for example, with use of at least 25 wt. % catalyst (carbon black-platinum) with the balance being perfluorinated ionomer polymer. Preferably, the electrode in this composite structure has some porosity and is reactant diffusive.

For use as an electrode support, the porous or expanded polytetrafluoroethylene film should be thin and can have, for example, a thickness of about 3 microns to about 200 microns, and more particularly, about 3 microns to about 30 microns, and preferably about five microns to about 20 microns. This relatively thin catalyst-containing electrode can be contacted with other electrically conducting components which, for example, do not contain catalyst and provide passageway for reactants.

The pore volume of the electrode support can be, for example, about 60% to about 95%, and preferably, about 85% to about 95%. The maximum pore size defined by an isopropanol bubble point (IBP) can be, for example, about 0.05 kg/cm$^2$ to about 0.5 kg/cm$^2$, and preferably, about 0.05 kg/cm$^2$ to about 0.3 kg/cm$^2$. The Bubble Point was measured according to the procedures of ASTM F316-86. Isopropyl alcohol was used as the wetting fluid to fill the pores of the test specimen. The Bubble Point is the pressure of air required to displace the isopropyl alcohol from the largest pores of the test specimen and create the first continuous stream of bubbles detectable by their rise through a layer of isopropyl alcohol covering the porous media. This measurement provides an estimation of maximum pore size.

Before deposition of the zone of second catalytically active metal, the electrode preferably has relatively low level of catalyst loading such as, for example, about 0.01 mg/cm$^2$ to about 1 mg/cm$^2$, and preferably, about 0.02 mg/cm$^2$ to about 0.5 mg/cm$^2$, and more preferably, about 0.05 mg/cm$^2$ to about 0.4 mg/cm$^2$. Preferably, it is less than about 0.3 mg/cm$^2$. Preferably, the total catalyst loading for a single MEA is less than about 0.65 mg/cm$^2$, and more preferably, less than about 0.2 mg/cm$^2$.

At least one first catalytically active metal is distributed throughout the porous surface of the electrodes. Catalytically active means that the metal is in some way helping to provide catalysis. The first and second catalytically active metals can be and preferably are the same metals. Both the first and second catalytically active metals can be, for example, noble metals or Group VIII metals. Particular examples include Pt, Pd, Ru, Rh, Ir, Ag, Au, Os, Re, Cu, Ni, Fe, Cr, Mo, Co, W, Mn, Al, Zn, Sn, with preferred metals being Ni, Pd, Pt, and the most preferred being Pt. If desired, a plurality of catalytically active metals (e.g., bimetallic) can also be selected from this list. Co-catalysts and promoters can also be present such as, for example, C, Ni, Al, Na, Cr, and Sn. Any conventional agents to enhance fuel cell performance can be used.

The first catalytically active metal is preferably in the form of metal loaded carbon particles. For example, the carbon particles can be loaded with metal in amounts of at least 10 wt. % metal, and preferably, at least 20 wt. % metal. Preferably, the first catalytically active metal is relatively uniformly distributed and randomly dispersed throughout the electrode. Electrodes can be, for example, formed from particles of high surface area carbon, such as Vulcan XC72 (about 200 m$^2$/g) or Black Pearls 2000 (about 1000 m$^2$/g) available from Cabot, Boston, Mass. which are loaded with particles of platinum of about 20 angstrom to about 50 angstrom size to an electrode area loading of about 0.35 mg/cm$^2$.

In addition to supported metal catalyst, the electrode should further comprise ionically conductive polymer to improve the contact of the electrode to the membrane and increase catalyst utilization. The ionically conductive polymer of the membrane (a "first ionically conductive polymer") can be substantially the same or different than the ionically conductive polymer of the electrode (a "second ionically conductive polymer"), although they preferably are substantially the same. Substantially the same means that, for example, the two ionically conductive materials, for example, can be selected to have different equivalent weights although having the same general chemical identity.

The electrode can further comprise at least one hydrophobic component such as a fluorinated polymer, preferably a perfluorinated polymer such as polytetrafluoroethylene. If desired, this hydrophobic component can be concentrated at the electrode-membrane interface. Other examples include tetrafluoroethylene/(perfluoroalkyl) vinyl ether copolymer (PFA), or tetrafluoroethylene/hexafluoropropylene copolymer (FEP). This fluorinated hydrophobic component can help improve water repellency in the electrode structure.

A pore-forming agent or sacrificial filler also can be included in the electrode such as, for example, ammonium bicarbonate, sodium chloride, or calcium carbonate. This agent can be removed by, for example, heating or leaching to create voids and improve gas diffusivity. Gas diffusivity can be tailored to the application.

The electrode can further comprise at least one solvent used during electrode preparation. However, solvent may slowly evaporate from the electrode. Hence, solvent initially present may not be present at a later time. Solvents are known in the art for electrode ink preparations. Exemplary solvents include polar solvents and alcohols.

The ionically conductive membrane should provide, for example, strength, high ionic conductance, and good interfacial contact with the electrode. The structure of the membrane is not particularly limited provided that these functional attributes are present. Reinforced composite membranes are preferred.

The membrane is preferably made largely of one or more fluorinated polymers, and preferably, mixtures of perfluorinated polymer and fluorinated ion exchange resin. In a preferred embodiment, the membrane is prepared from porous or expanded polytetrafluoroethylene which is impregnated with ion exchange resin such as a sulfonated perfluorinated ionomer including NAFION® (EW can be, for example, 1100). Similar ionomers such as, for example, FLEMION® (Asahi Glass) can also be used. Substantially all (>90%) of the open porous volume can be impregnated so that a high Gurley number (>10,000 seconds) is provided.

Impregnated membranes are described in, for example, U.S. Pat. Nos. 5,547,551; 5,635,041; and 5,599,614 to Bahar et al., which are hereby incorporated by reference. These patents describe test procedures and characteristics of the membranes.

Membranes can be prepared with use of a base material made in accordance with the teachings of U.S. Pat. No. 3,593,566 incorporated herein by reference. Base materials are available in various forms from W. L. Gore and Associates, Inc. (Elkton, Md). Such a base material has a porosity of greater than 35. Preferably, the porosity is between about 70% and 95%. The porous microstructure can comprise (i) nodes interconnected by fibrils, or (ii) fibrils.

Average pore size for the base material can be, for example, about 0.05 microns to about 0.4 microns. The pore size distribution value can be, for example, about 1.05 to about 1.20. Pore size measurements are made by the Coulter Porometer™, manufactured by Coulter Electronics, Inc. (Hialeah, Fla.). The Coulter Porometer is an instrument that provides automated measurement of pore size distributions in porous media using the liquid displacement method described in ASTM Standard E1298-89. The Porometer determines the pore size distribution of a sample by increasing air pressure on the sample and measuring the resulting flow. This distribution is a measure of the degree of uniformity of the membrane (i.e., a narrow distribution means there is little difference between the smallest and largest pore size). The Porometer also calculates the mean flow pore size. By definition, half of the fluid flow through the filter occurs through pores that are above or below this size.

High Gurley numbers are preferred for the membrane. The Gurley air flow test measures the time in seconds for 100 cc of air to flow through a one square inch sample at 4.88 inches of water pressure in a Gurley Densometer (ASTM 0726-58). The sample is placed between the clamp plates. The cylinder is then dropped gently. The automatic timer (or stopwatch) is used to record the time (seconds) required for a specific volume recited above to be displaced by the cylinder. This time is the Gurley number. The Frazier air flow test is similar but is mostly used for much thinner or open membranes. The test reports flow in cubic feet per minute per square foot of material at 0.5 inches water pressure.

The composite membrane is preferably thin having a thickness of, for example, more than about 3 microns, but less than about 75 microns, and more preferably, less than about 50 microns, and even more preferably, less than about 30 microns. About 20 microns and less is most preferred. Membrane thickness can be determined with use of a snap gauge such as, for example, Johannes Kafer Co. Model No. F1000/302). Measurements are taken in at least four areas in each specimen.

In addition, the membranes should have high ionic conductance, preferably greater than about 8.5 mhos/cm$^2$, and more particularly, greater than about 22 mhos/cm$^2$. Ionic conductance can be tested using a Palico 9100-2 type test system. This test system consisted of a bath of 1 molar sulfuric acid maintained at a constant temperature of 25° C. Submerged in the bath were four probes used for imposing current and measuring voltage by a standard "Kelvin" four-terminal measurement technique. A device capable of holding a separator, such as the sample membrane to be tested, was located between the probes. First, a square wave current signal was introduced into the bath, without a separator in place, and the resulting square wave voltage was measured. This provided an indication of the resistance of the acid bath. The sample membrane was then placed in the membrane-holding device, and a second square wave current signal was introduced into the bath. The resulting square wave voltage was measured between the probes. This was a measurement of the resistance due to the membrane and the bath. By subtracting this number from the first, the resistance due to the membrane alone was found.

Impregnated composite membranes can be prepared by repeatedly contacting one or both sides of the base porous substrate with a solution of ionically conductive polymer. Surfactants can be used to impregnate. In each impregnation step, solvent can be removed and heating carried out to help bind or lock the jonically conductive polymer in the base substrate. Particularly preferred membranes include those known as GORE-SELECT® available from W. L. Gore and Associates, Inc (Elkton, Md.).

An important advantage of this invention is in avoiding difficulties of combining thin membranes with an electrode by traditional methods like hot-pressing. Membrane damage can occur. The electrode-membrane combination should be mechanically and electrochemically compatible.

The electrode is brought into contact with the membrane to form an interfacial region. At the interfacial region, both membrane and electrode can influence activity occurring at the region. This interfacial region, like the membrane and the electrode, generally is substantially planar. At this interfacial region resides a zone, which preferably is a layer or coating, of the second catalytically active metal which unexpectedly and substantially improves the power output of the fuel cell. The interfacial region may not be perfectly homogeneous because the mating surfaces can have, for example, softness, inhomogeneity, and surface roughness. However, the zone of second catalytically active metal is associated more with the electrode side of the interface than the membrane side because the zone, like the electrode, is electronically conductive. Nevertheless, it can be possible in some cases for some of the zone to be associated with the membrane as well depending on the process used to generate the interface and the zone of second catalytically active metal.

The incorporation of the zone of second catalytically active metal at the interfacial region can result in a large percent increase in current density ($mA/cm^2$), and also power output ($p=I \times V$), at a given voltage on a polarization curve (e.g., 0.6 V) compared to a reference MEA without the zone of second catalytically active metal. This percentage increase can be as high as 20% or more, and preferably, 30%, and more preferably, 40% or more. In some cases, improvements over 90% have been observed.

Surprisingly, greater percent increases can be found for thinner zones. Hence, an important advantage of this invention is that high percent power increases can be observed with introduction of only a thin catalytic layer, and an R ratio can be defined as:

percent increase in current density/zone thickness (Å)

wherein current densities are measured at 0.6 V in the polarization curve under steady-state conditions. Cell temperature should be between about 60° C. and about 80° C., and preferably, about 65° C. For example, this R ratio is about 0.7 when a 33% percent increase is found for deposition of a 50 angstrom layer (see working examples). Similarly, this R ratio is about 0.9 when a 46% increase is found for deposition of a 50 angstrom layer. Surprisingly, R can be greater than 22 (22.6) when a 113% increase is found for a 5 angstrom coating. Hence, a surprising feature of this invention is R values greater than 0.5, preferably greater than 1, more preferably greater than 5, more preferably greater than 10, and even more preferably greater than 20. If desired, the R value can be less than 50, and preferably less than 30, if the system needs to be tailored to a particular application. Calculation of this R ratio assumes that some fuel cell reaction occurs in the absence of the zone of second catalytically active metal.

The thickness of the zone of second catalytically active metal, which represents average thickness, can be determined by methods known in the art. These methods include use of, for example, a microbalance together with use of deposition rate and deposition time (e.g., 1 Å/sec deposition rate for 50 seconds of deposition yields approximately 50 Å average thickness). Calibration curves can be established to help determine thickness. In general, the thickness can be about 3 angstroms to about 475 angstroms, and more particularly, about 5 angstroms to about 250 angstroms, and even more particularly, about 5 angstroms to about 50 angstroms. Thicknesses much greater than about 475 angstroms, in general, can reduce layer uniformity and possibly block diffusion. However, the degree to which diffusion is blocked can depend on the structure of the zone.

Examples of loadings of the zone of at least one second catalytically active metal include about 0.0006 $mg/cm^2$ to about 0.12 $mg/cm^2$, and more particularly about 0.0007 $mg/cm^2$ to about 0.09 $mg/cm^2$, and more particularly, 0.001 $mg/cm^2$ to about 0.05 $mg/cm^2$, and more particularly, about 0.005 $mg/cm^2$ to about 0.02 $mg/cm^2$.

Typical vacuum deposition methods include chemical vapor deposition, physical vapor or thermal deposition, cathodic arc deposition, ion sputtering, and ion beam assisted deposition (IBAD). A method which requires less vacuum is jet vapor deposition. Because the materials are deposited in vacuum (typically less than 13.3 mPa, or $1 \times 10^{-4}$ torr), contamination of the films can be minimized while maintaining good control over film thickness and uniformity. Deposition over large areas can be achieved via reel-to-reel or web coating processes. The present invention makes use of these and other vacuum deposition techniques, particularly magnetron sputtering and physical vapor deposition.

Most preferably, electron beam—physical vapor deposition (EB-PVD) is used. Deposition rates can range, for example, from 0.1 Å/sec to 10 Å/sec. If necessary, heating of the substrate can be limited.

In addition, methods such as, for example, combustion chemical vapor deposition (CCVD) can be used which do not require a vacuum. Wet chemical methods can be used but are not preferred.

The structure or morphology of the deposited zone of the at least one second catalytically active metal can depend on, for example, the deposition method and the loading of the second catalytically active metal. The structure can be analyzed by, for example, field-emission scanning electron microscopy (FE-SEM). This analysis shows that relatively uniform zones of the second catalytically active metal are formed. This substantial uniformity is present irrespective of the type of film morphology present. In general, sputter deposition can provide more dense zones than thermal evaporation methods such as EB-PVD. In general, the EB-PVD zones can exhibit a greater degree of surface texture. Although the theory and detailed structure of the present invention are not fully understood, the excellent power improvements found herein may be due to the relatively open surface texture. This openness may provide, for example, better reactant transport and more surface area for reaction.

At relatively thin zone thicknesses of, for example, five angstroms, the FE-SEM analysis of the electrode can reveal small but measurable increases in field brightness compared to the reference electrode without a deposited zone. Surprisingly, relatively uniform deposition was observed. At thicker thicknesses of, for example, 50 angstroms, the FE-SEM analysis can reveal substantially spherical nodules of deposited metal approximately 25 nm to about 100 nm, and in particular, about 30 nm to about 70 nm, and more particularly, about 50 nm in diameter. At even greater thicknesses of, for example, 500 angstroms, the FE-SEM analysis can reveal, in addition to the substantially spherical nodules, rod-shaped structures in which the rods have diameters of about 20 nm to about 100 nm, and more particularly, about 20 nm to about 60 nm, and even more particularly, about 40 nm. The rod length can vary. Whisker or hair-like morphology can be produced.

Several methods can be used to assemble the half cell or MEA which incorporates the zone. In describing these methods, assembly elements include the electrode and the membrane. The zone can be deposited on assembly elements either directly or indirectly. In direct deposition, the zone is deposited directly on the electrode, the membrane, or both as part of MEA assembly. In indirect deposition, however, the zone is initially deposited onto a substrate, not an assembly element, and then the zone is transferred from the substrate to the assembly element, preferably the membrane. The substrate can be, for example, low surface energy support such as skived polytetrafluoroethylene which allows for ready transfer and preservation of the zone.

Additional components and conventional methods can be used to assemble fuel cells and stacks. For example, gas diffusion media include CARBELO® CL available from W. L. Gore and Associates, Inc. MEAs known as PRIMEA® (including 5000 and 5510 series) are also available from W. L. Gore and Associates, Inc. Fuel cell gaskets can be made of, for example, GORE-TEX®, also available from W. L. Gore and Associates, Inc. The present invention is not particularly limited by these additional components and methods.

The invention is versatile and can be used in a variety of applications including: (i) transportation vehicles such as cars, trucks, and buses which have requirements including high power density and low cost; (ii) stationary power applications, wherein high efficiency and long life are required; and (iii) portable power applications such as portable television, fans, and other consumer products. Methods to use fuel cells in these applications are known.

Surprisingly, MEAs according to this invention can provide catalyst mass activities greater than 2,500 mA/mg of catalytically active metal, and preferably, greater than 5,000 mA/mg of catalytically active metal. At this catalyst mass activity level, commercialization becomes feasible. The zone of second catalytically active metal does not modify important commercial considerations such as the existing water balance. Hence, MEAs according to the present invention can be operated under the same temperature and humidification conditions.

Additional fuel cell technology is described in, for example, the references cited in the background as well as the following references, which are hereby incorporated by reference: (i) "High performance proton exchange membrane fuel cells with sputter-deposited Pt layer electrodes"; Hirano et al.; *Electrochimica Acta*, vol. 42, No. 10, pp. 1587–1593 (1997); (ii) "Effect of sputtered film of platinum on low platinum loading electrodes on electrode kinetics of oxygen reduction in proton exchange membrane fuel cells"; Mukerjee et al.; *Electrochimica Acta*, vol. 38, No. 12, pp. 1661–1669 (1993); (iii) "Sputtered fuel cell electrodes"; Weber et al.; *J. Electrochem. Soc.*, June 1987, pp. 1416–1419; and (iv) "Anodic oxidation of methanol at a gold modified platinum electrocatalyst prepared by RF sputtering on a glassy carbon support"; *Electrochimica Acta*, Vol. 36, No. 5/6, pp. 947–951, 1991.

The invention is further described by means of the following non-limiting examples.

EXAMPLES

General Procedures

In each example, unless otherwise noted, the ionically conductive membrane (proton exchange membrane, PEM) was 20 microns thick. The membrane was a fully impregnated membrane of high Gurley number (>10,000 seconds) and high ionic conductance prepared by impregnating expanded polytetrafluoroethylene with a perfluorinated sulfonic acid resin (FLEMION®, EW 950) as described in U.S. Pat. Nos. 5,547,551; 5,635,041; and 5,599,614 to Bahar et al. The membrane is called GORE-SELECT® and is available from W. L. Gore and Associates, Inc.

The electrode comprising the first catalytically active metal, unless otherwise noted, was prepared as described above for Procedure A to generate a target metal loading. The membrane comprises Pt supported on carbon, ionically conductive polymer, and solvent. The electrodes had platinum loadings which ranged from 0.05 mg Pt/cm$^2$ to 0.4 mg Pt/cm$^2$.

In Examples 2 and 4 below, a zone of second catalytically active metal was coated or deposited onto a substrate, either electrode or membrane, by electron beam physical vapor deposition (EB-PVD). In this procedure, a substrate, typically 6 in.×6 in., was mounted onto a 4-point holder carrousel in a vacuum chamber, where each holder was mounted on a rotating axis, each of which could rotate about the main axis of the carrousel. A platinum target was prepared by melting 99.95% purity platinum coins in a 2 in.×2 in. crucible in the vacuum chamber (1.5 m diameter, 2 m long), followed by recooling. The crucible was also located in the vacuum chamber. The chamber was then evacuated to less than 10$^{-4}$ torr (e.g., 5×10$^{-5}$ torr) using a diffusion pump. The platinum target was then evaporated using an electron beam for heating, and platinum was condensed onto the substrate. A real uniformity of the deposited coating was ensured by rotating the sample about both rotational axes of the holder during deposition. The amount of platinum zone deposited was measured using a vibrating crystal microbalance, calibration curves, and deposition rates and times. Zone thickness and loading amounts were calculated.

In Examples 1–3 and 5 below, I–V measurements were obtained after the MEA had reached steady state.

In each Example, the area of the cathode and anode contacting the membrane were substantially the same. In practicing this invention, however, these areas do not need to be the same.

Unless otherwise noted, MEA testing was carried out with: 25 cm$^2$ electrode active area; ELAT® gas diffusion media (available from E-TEK, Inc., Natick, Mass.); clamping at 200 lb in/bolt torque; and GLOBE TECH® computer controlled fuel cell test station. The gas diffusion media was believed to comprise approximately 70% graphite cloth and 30% polytetrafluoroethylene. Clamping assured compression of the MEA to the flow field and diffusers.

Catalyst and electrode layers were supported on polytetrafluoroethylene backings and were transferred from the backing to the membrane by decal methods with hot pressing. Unless otherwise noted, hot pressing was carried out for 3 minutes at 160° C. with a 15 ton load. The backing was subsequently peeled off, leaving the coated layer(s) bonded to one side of the membrane and positioned centrally.

Reference MEAs, unless otherwise noted, were substantially the same as the MEA according to the invention except that no z-gradient zone was present in the reference MEA.

Example 1

Example 1 illustrates the indirect method wherein the zone of second catalytically active metal is first deposited onto a substrate before transfer from the substrate to the membrane or electrode.

A 50 Å platinum coating zone (0.01 mg/cm$^2$) was deposited at 1 Å/sec onto a skived PTFE substrate backing by EB-PVD. The catalyst zone was then transferred onto the membrane by the decal method leaving the 50 Å catalyst zone bonded to one side of the membrane and positioned centrally. The area of the membrane demarcated by the transferred catalyst is the active area. A catalyzed electrode (0.3 mg Pt/cm$^2$) was attached to each side of the catalyzed membrane also using the decal method, so as to overlay the active area. Therefore, one side of the MEA had a z-gradient zone of platinum at the membrane/electrode interface.

The prepared MEAs with 25 cm$^2$ active areas were each loaded between gaskets in a 25 cm$^2$ active area fuel cell test fixture or cell. The electrode containing the z-gradient zone was placed towards the cathode where it would be in contact with the oxidant (air). The test fixture was then attached to the fuel cell test station for acquisition of data.

MEA performance was evaluated with the cell pressure at 0 psig and at 15 psig. For the 0 psig cell pressure runs, the cell was operated at 60° C., with hydrogen and air humidified to dew points of 20° C. and 55° C. respectively. For the 15 psig cell pressure runs, the cell was operated at 75° C., with hydrogen and air both supplied at 15 psig and humidified to dew points of 30° C. and 70° C. Hydrogen and air flow rates were set to 2 and 3.5 times the stoichiometric value theoretically needed to produce a given cell current output.

Figure 5:
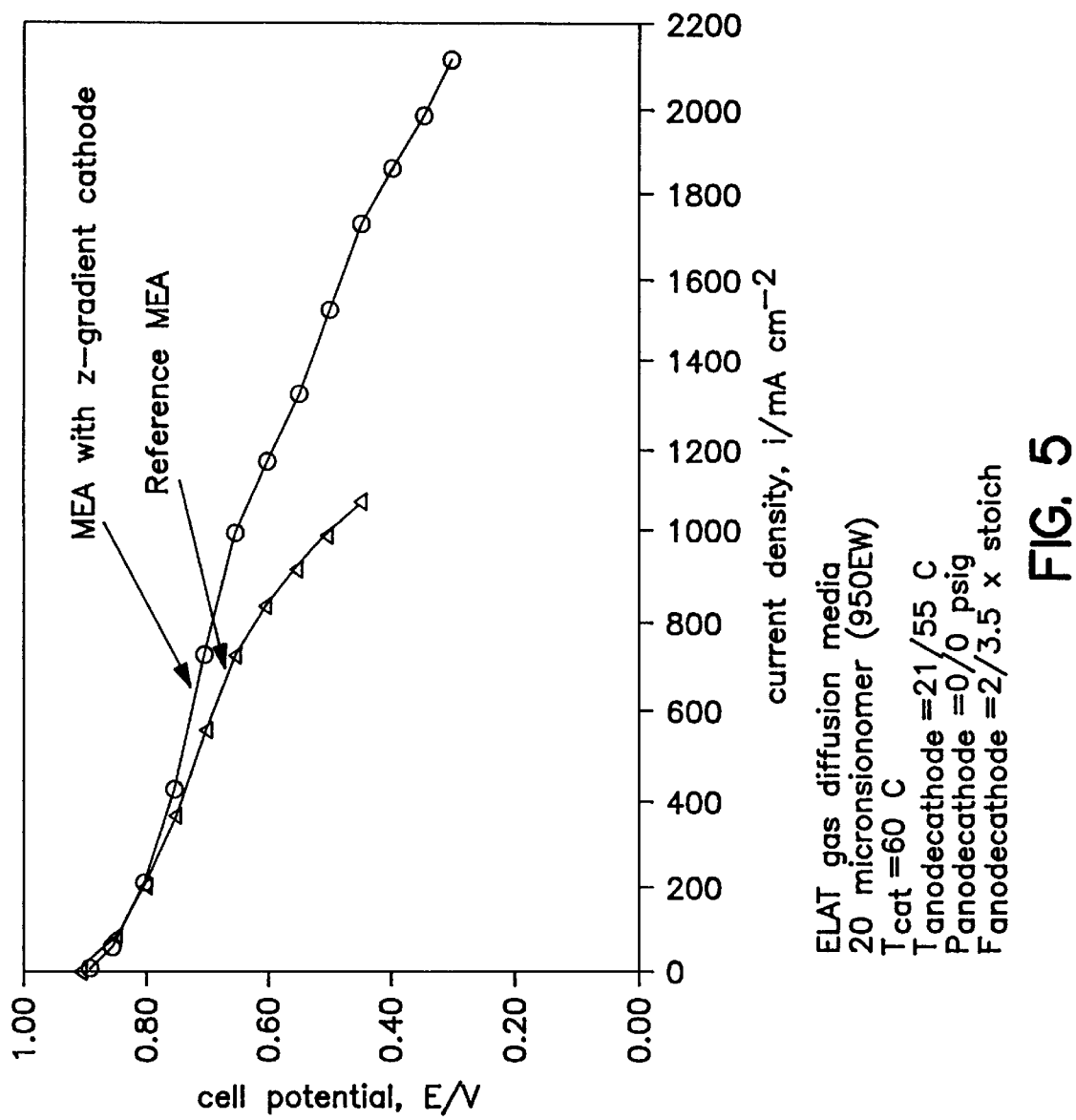
FIG. 5 shows current-voltage (I–V) analysis (or polarization curve) of an MEA with a z-gradient cathode (Example 1) compared to a reference MEA without a z-gradient cathode.

FIG. 5 shows the fuel cell output voltage at various current outputs for the MEA at 0 psig. Superior performance was observed in the MEA according to the invention compared to a reference MEA which was substantially the same except it did not contain the z-gradient catalyst layer. For example, at 0.6 V, the MEA according to the invention produced almost 1200 MA/cm$^2$ versus only about 820 mA/cm$^2$ for the reference (a 46% increase).

Figure 6:
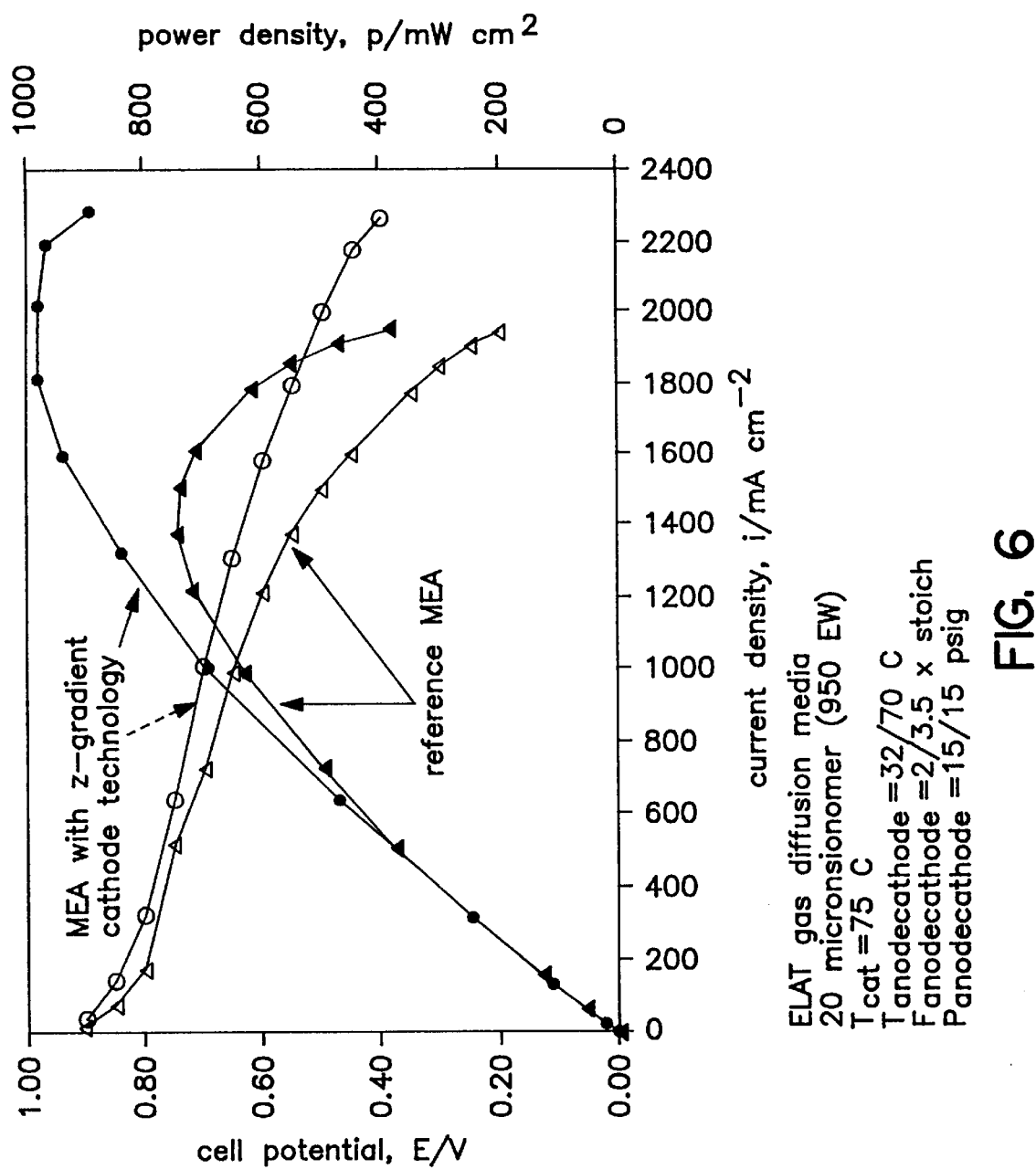
FIG. 6 is another I–V analysis of an MEA with a z-gradient cathode (Example 1) compared against a reference MEA.

Similarly, FIG. 6 shows data for the 15 psig cell. Again, the polarization analysis showed improved performance over the entire range of current densities. At 0.6 V, for example, the MEA containing z-gradient cathode produced almost 1600 mA/cm$^2$ versus only 1200 mA/cm$^2$ for the reference MEA (33% increase) which was substantially the same but did not contain the z-gradient cathode. Power density is also plotted in FIG. 6 (p–I×V), and improved power density was also evident.

Figure 7:
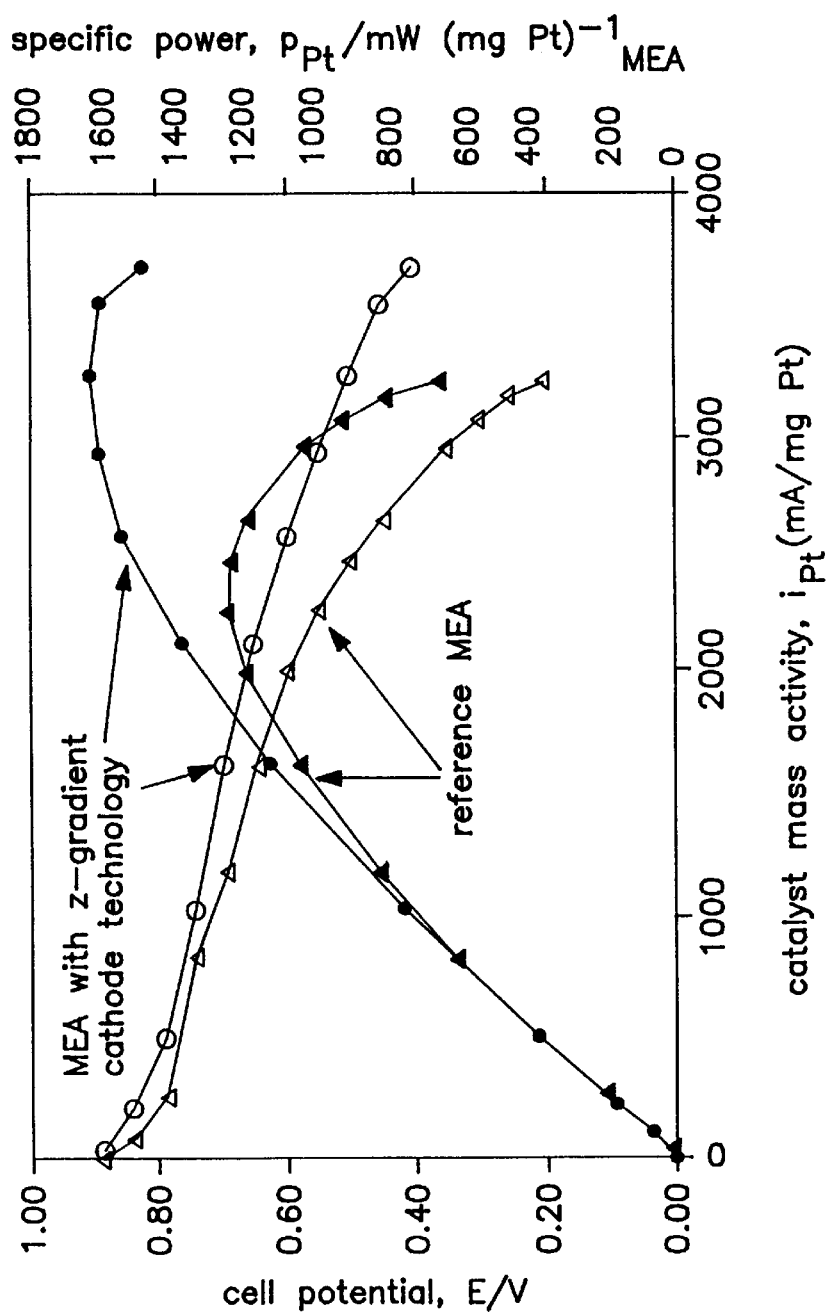
FIG. 7 includes normalized I–V analysis of an MEA with a z-gradient cathode (Example 1) compared against a reference MEA.

FIG. 7 shows an electrocatalyst mass activity analysis for the 15 psig cell. The mass activity is the amount of current generated (or alternatively power generated) per unit mass of catalyst metal in the active area. Hence, mass activity units are mA/mg Pt for current generation (and mW/mg Pt for power generation). At 0.6 V, the MEA with z-gradient cathode surprisingly produced over 2,500 mA/mg Pt compared to only 2,000 mA/mg Pt (i.e., a 25% increase) for the reference MEA which was substantially similar but did not contain the z-gradient cathode.

Figure 8:
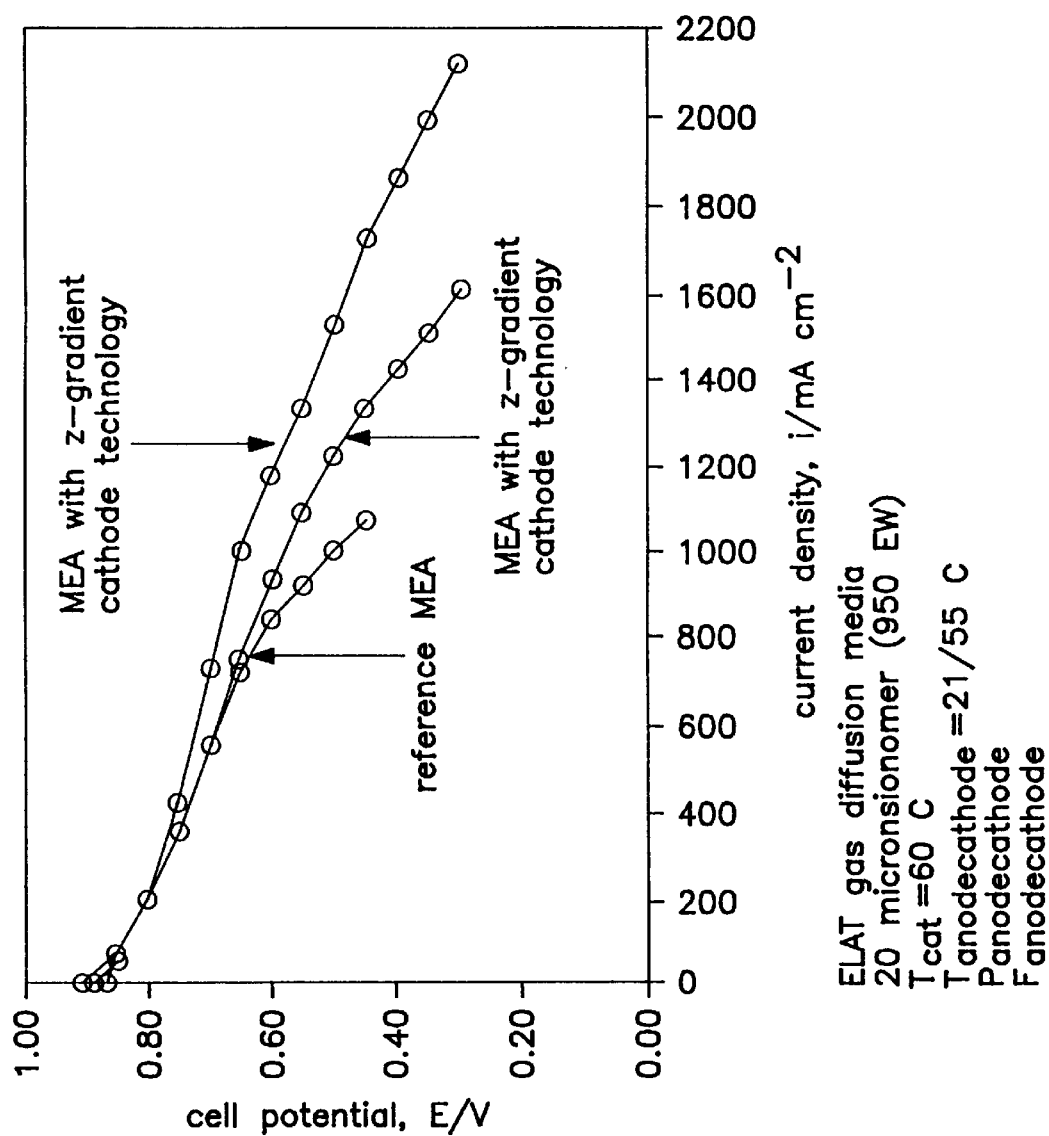
FIG. 8 shows I–V analyses of both an MEA with a z-gradient cathode and an MEA with a z-gradient anode (Example 1) each compared against a reference MEA.

FIG. 8 shows data for an MEA at 0 psig where the z-gradient catalyst zone was part of the anode rather than cathode. Surprisingly, the polarization analysis revealed an improvement in performance with a z-gradient anode (12% increase at 0.6 V), although the improvement was not as large as for the MEA with a z-gradient cathode.

Example 2

In this Example, direct deposition of the zone on the electrode was carried out at two zone thicknesses. Deposition was carried out by EB-PVD. The catalyzed electrodes having the z-gradient deposited thereon had a loading of 0.1 mg Pt/cm$^2$ before deposition. For one sample, the deposition rate was 0.2–0.3 Å/sec to achieve a 50 Å zone (0.01 mg Pt/cm$^2$). A second electrode was coated at a rate of o.1 Å/sec to achieve a 5 Å zone (0.001 mg Pt/cm$^2$). An electrode (anode) containing 0.05 mg/cm$^2$ of platinum was used for both samples.

MEA performance was again evaluated with the cell pressure at 0 psig and at 15 psig. For all runs, the cell was operated at 65° C., with hydrogen and air both supplied at 0 psig, and humidified to dew points of 60° C. Hydrogen and air flow rates were set to 1.2 and 3.5 times the stoichiometric value theoretically needed to produce a given cell current output respectively.

Figure 9:
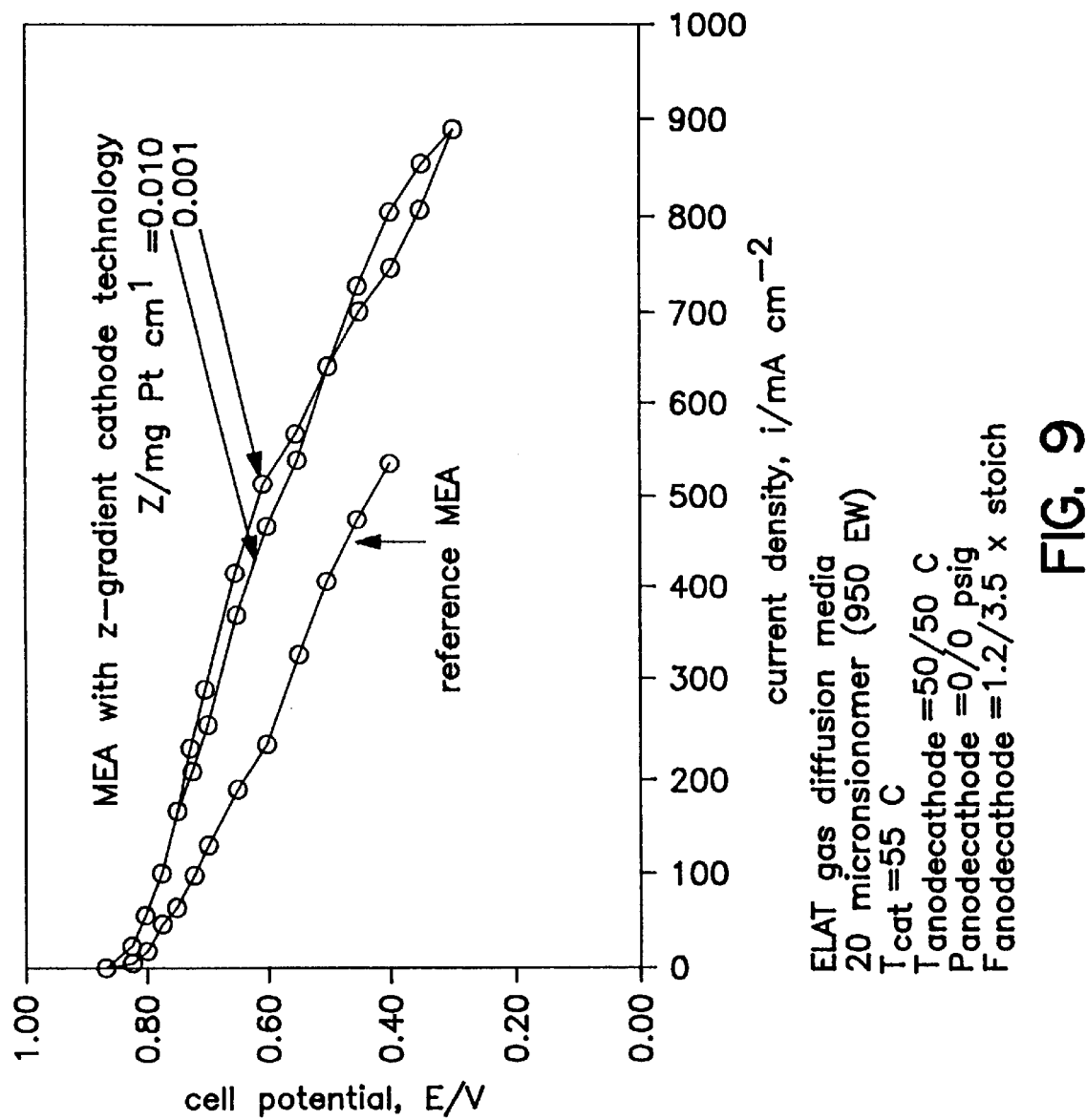
FIG. 9 shows analyses of MEA with a z-gradient cathode at two different loadings (Example 2) compared against a reference MEA.

FIG. 9 shows the improved power output at 0 psig. Improvements in current density were observed at 0.6 V from 240 mA/cm$^2$ for the reference MEA: (i) to 460 mA/cm$^2$ for the 50 Å deposition (92w increase), and (ii) to 510 mA/cm$^2$ for a 5 Å deposition (113% increase). Surprisingly, the lower loading (thinner deposition) provided a greater percentage increase at this voltage.

Figure 10:
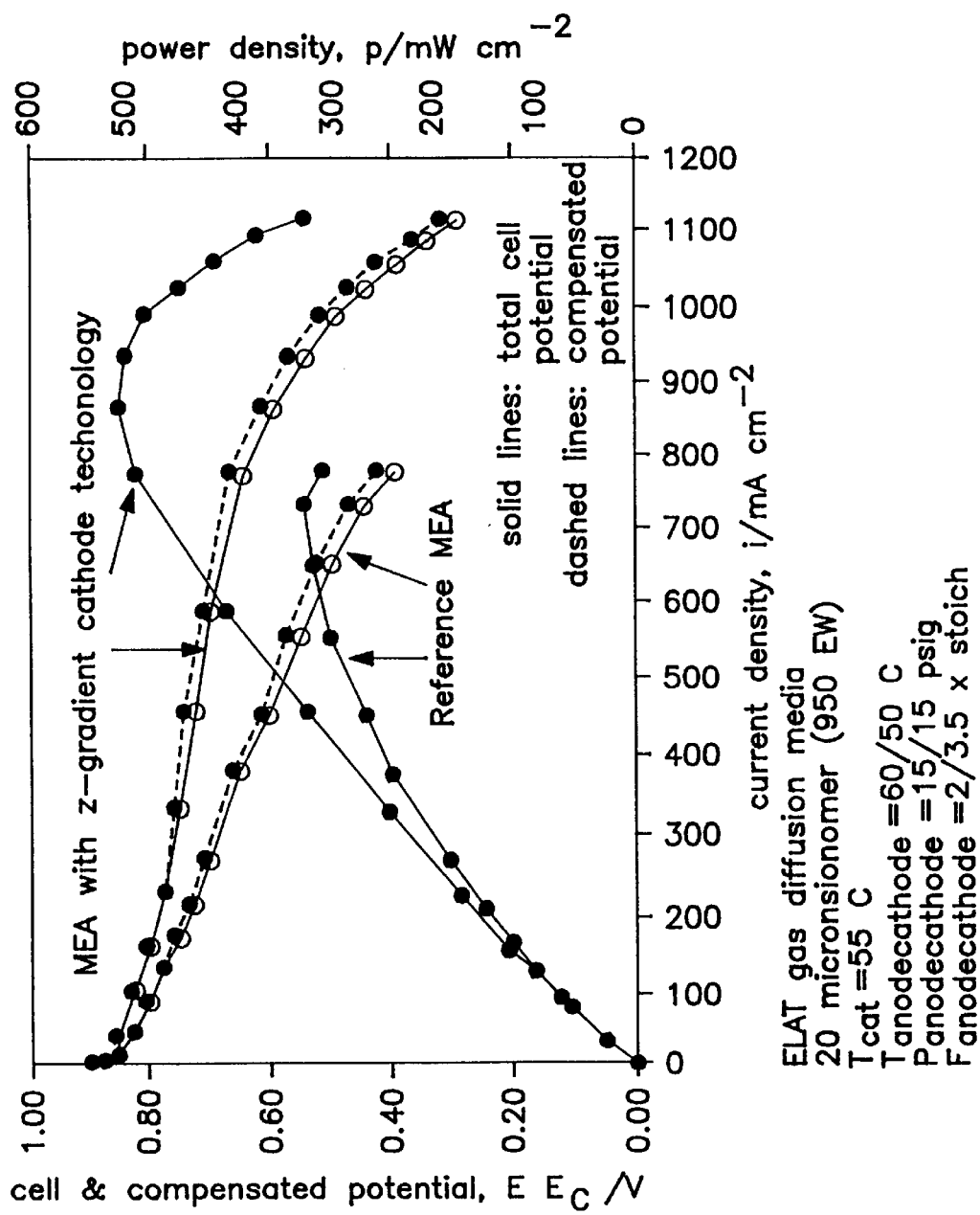
FIG. 10 shows I–V analysis of an MEA with a z-gradient cathode (Example 2) compared against a reference MEA. A compensated potential analysis is also provided.

FIG. 10 shows fuel cell performance at 15 psig cell pressure, in terms of both current density and power density, for the 5 Å sample. The data indicated an increase in current density at 0.6 V from 440 to 860 mA/cm$^2$ (95% increase), with a substantial increase in peak power density.

FIG. 10 also shows polarization performance as compensated cell potential versus current density at 15 psig. When the polarization curve is expressed in terms of compensated potential, the electrocatalytic performance of the z-gradient cathode is shown independent of the effects of other MEA components. By comparison of compensated potentials, FIG. 10 showed that improved MEA performance was due to improved cathode performance (resulting from z-gradient layer), and not from some other spurious secondary effects.

Figure 11:
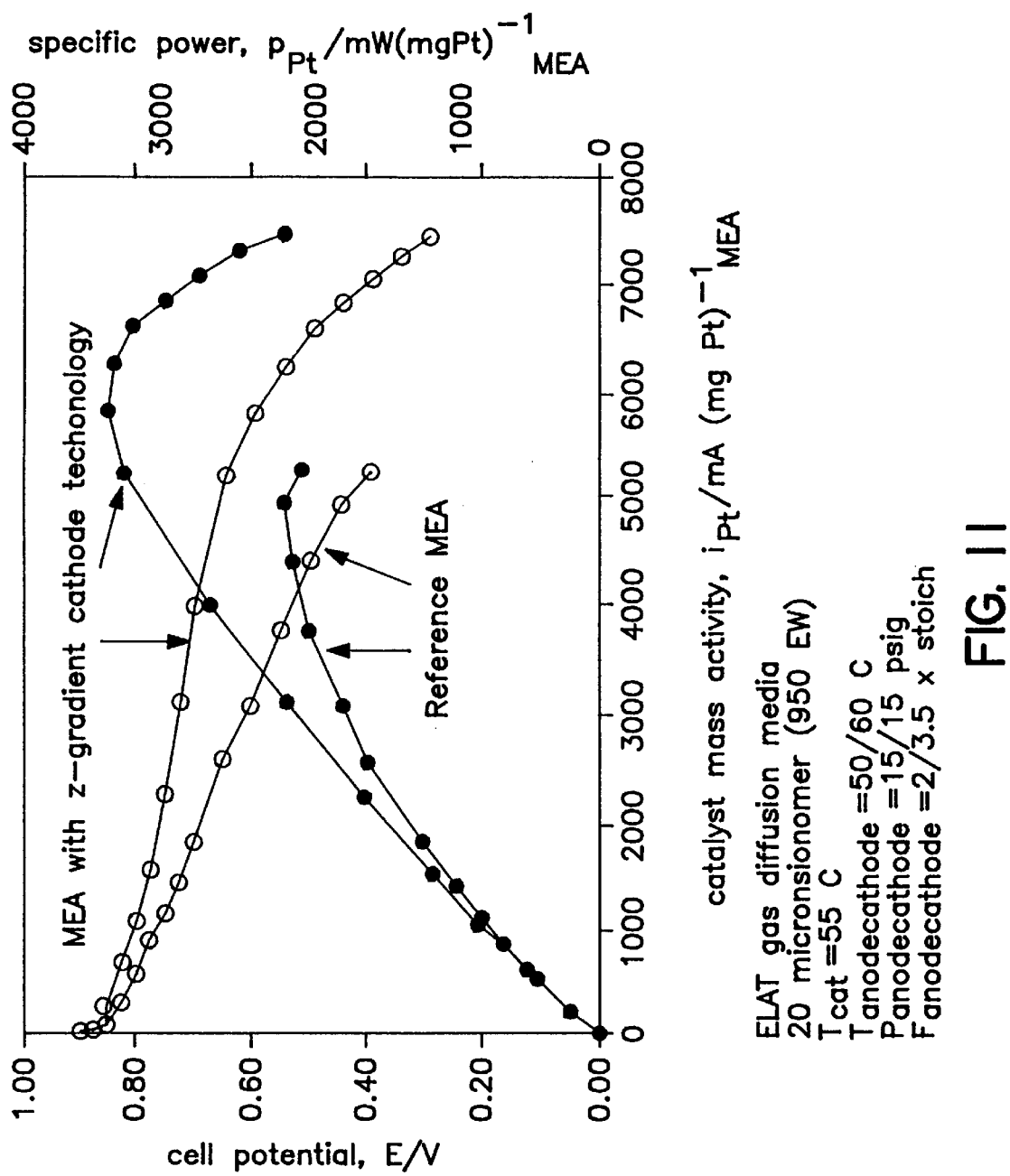
FIG. 11 is a normalized I–V analysis of an MEA with a z-gradient cathode (Example 2) compared against a reference MEA.

FIG. 11 shows the corresponding improvement in electrocatalyst mass activity and specific power at 15 psig. The observed enhancement in electrocatalyst utilization was proportional to the enhancement in current/power density.

Surprisingly, the percent increases in current found at 0.6 V were significantly higher in Example 2 compared to Example 1. In addition, the MEAs of Example 2 had less precious metal than the MEAs of Example 1.

Example 3

This example illustrates DC magnetron sputtering compared to EB-PVD. An electrode (0.4 mg Pt/cm$^2$) on a skived PTFE backing was coated by D.C. magnetron sputtering. A 0.127 mm thickness, 99.9% purity platinum foil served as target, and the vacuum chamber base pressure was maintained at $8 \times 10^{-4}$ torr. More specifically, a vacuum less than $10^{-4}$ torr was established, and then high purity argon was bled in so that the pressure rose to $8 \times 10^{-4}$ torr. Platinum deposition rate was about 1 Å/sec continuous to achieve a platinum loading of 0.01 mg/cm$^2$ (50 Å). This sputtered electrode was used as cathode. An unsputtered electrode (0.4 mg Pt/cm$^2$) served as anode.

MEA performance was evaluated with the cell pressure at 0 psig and at 15 psig. For the 0 psig cell pressure runs, the cell was operated at 70° C., with hydrogen and air both supplied at 0 psig, and humidified to dew points of 55° C. and 70° C. respectively. The 15 psig runs were performed at a cell temperature of 80° C., with hydrogen and air both supplied at 15 psig, and humidified to dew points of 600C. and 75° C. respectively. For all runs, hydrogen and air flow rates were set to 2 and 3.5 times the stoichiometric values respectively.

Figure 12:
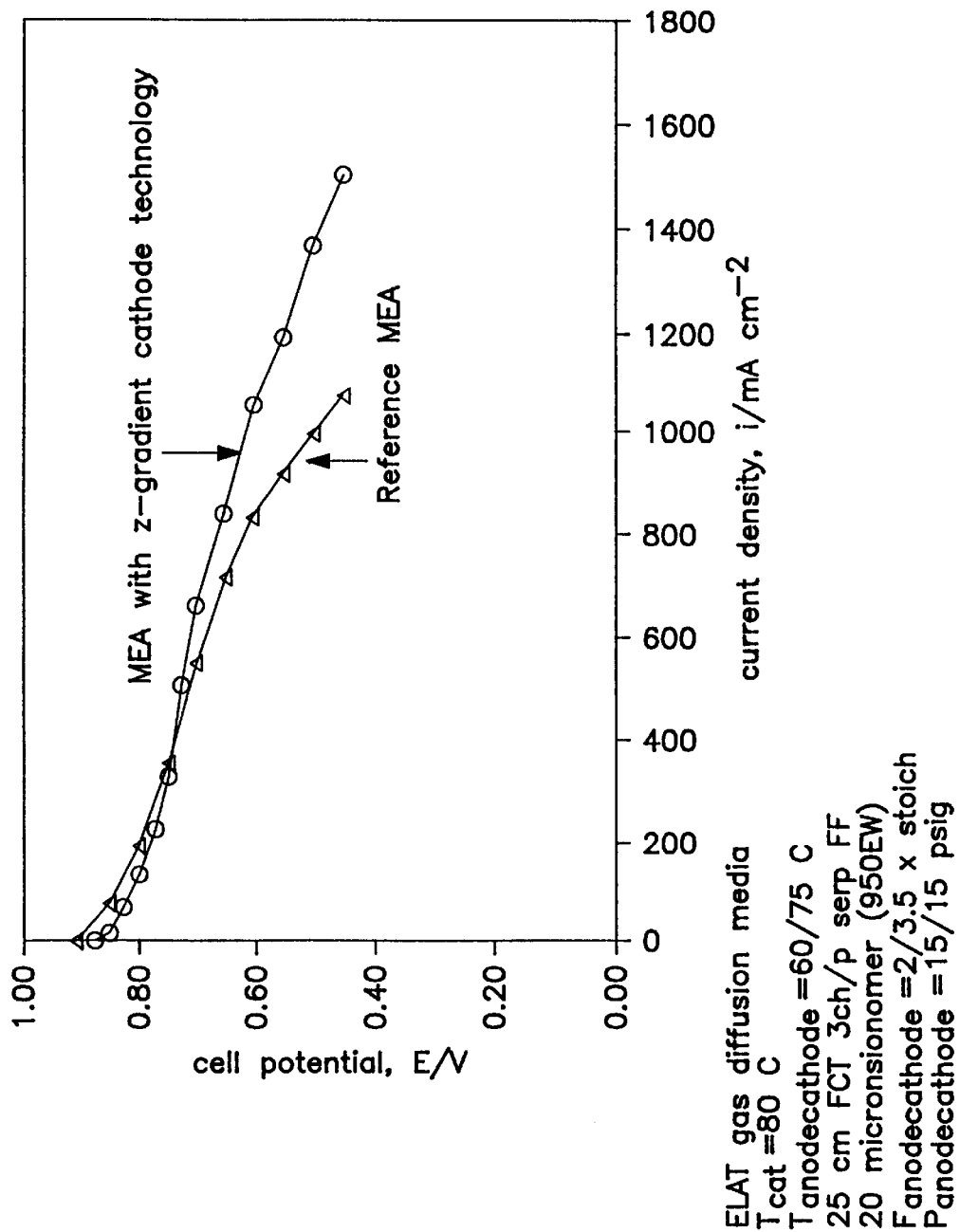
FIG. 12 is an I–V analysis of an MEA with a z-gradient cathode (Example 3) compared against a reference MEA.
Figure 13:
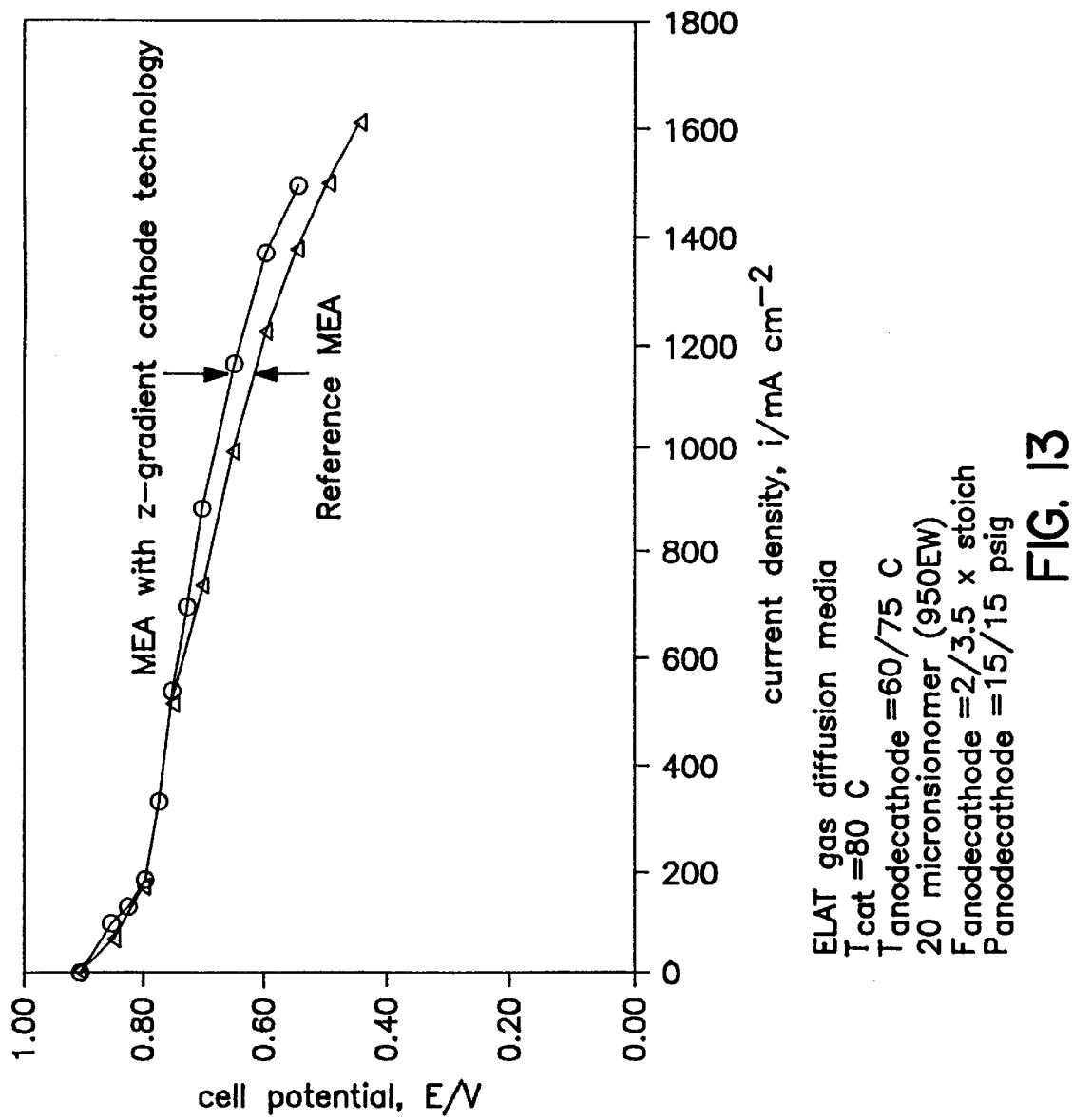
FIG. 13 is an I–V analysis of an MEA with a z-gradient cathode (Example 3) compared against a reference MEA.

FIG. 12 shows that for 0 psig at 0.6 V there is an improvement in current density from 820 mA/cm$^2$ for the reference MEA to 1050 mA/cm$^2$ (28% increase) for the sputtered z-gradient MEA. FIG. 13 shows fuel cell performance at 15 psig cell pressure. There is an improvement in current density from 1200 mA/cm$^2$ (reference MEA) to 1360 mA/cm$^2$ for the sputtered cathode (13% increase). Hence, the percent increases in Example 3 were not as great as observed in Example 2.

Example 4

Membranes were coated with platinum using EB-PVD and DC magnetron sputtering. Loadings for different samples were 0.001, 0.01, 0.05, and 0.1 mg Pt/cm$^2$. One side of the membrane was coated. MEAs were prepared from the coated membranes.

Example 5

A zone of second catalytically active metal (50 Å) was deposited onto the membrane by the indirect transfer method. The Pt/skived PTFE was hot pressed against the membrane to bond the Pt evaporated layer to the membrane by the decal method. The skived PTFE layer was peeled off, thus leaving a zone of 50 Å Pt layer bonded to the membrane. Catalyzed electrodes (0.3 mg Pt/cm$^2$) were then attached by hot pressing to form a first MEA.

A second MEA was prepared in which the cathodic active phase was just the electrode structure formed by a thin 50 Å Pt layer bonded to the membrane. The anode had a loading of 0.2 mg Pt/cm$^2$.

Polarization performance was evaluated at 0 psig cell pressure. The atmospheric pressure run, having both anode and cathode at 0/0 psig respectively, was performed at 60° C. cell temperature with hydrogen and air reactants saturated in humidification bottles to ca. 100% relative humidity. The anode, hydrogen, and cathode, air, reactants were then saturated at 20/60° C., respectively. The reactant flow was set to 2/3.5 times the stoichiometric value, for hydrogen and air respectively, and the stoichiometric flow was maintained throughout the polarization curve.

Figure 14:
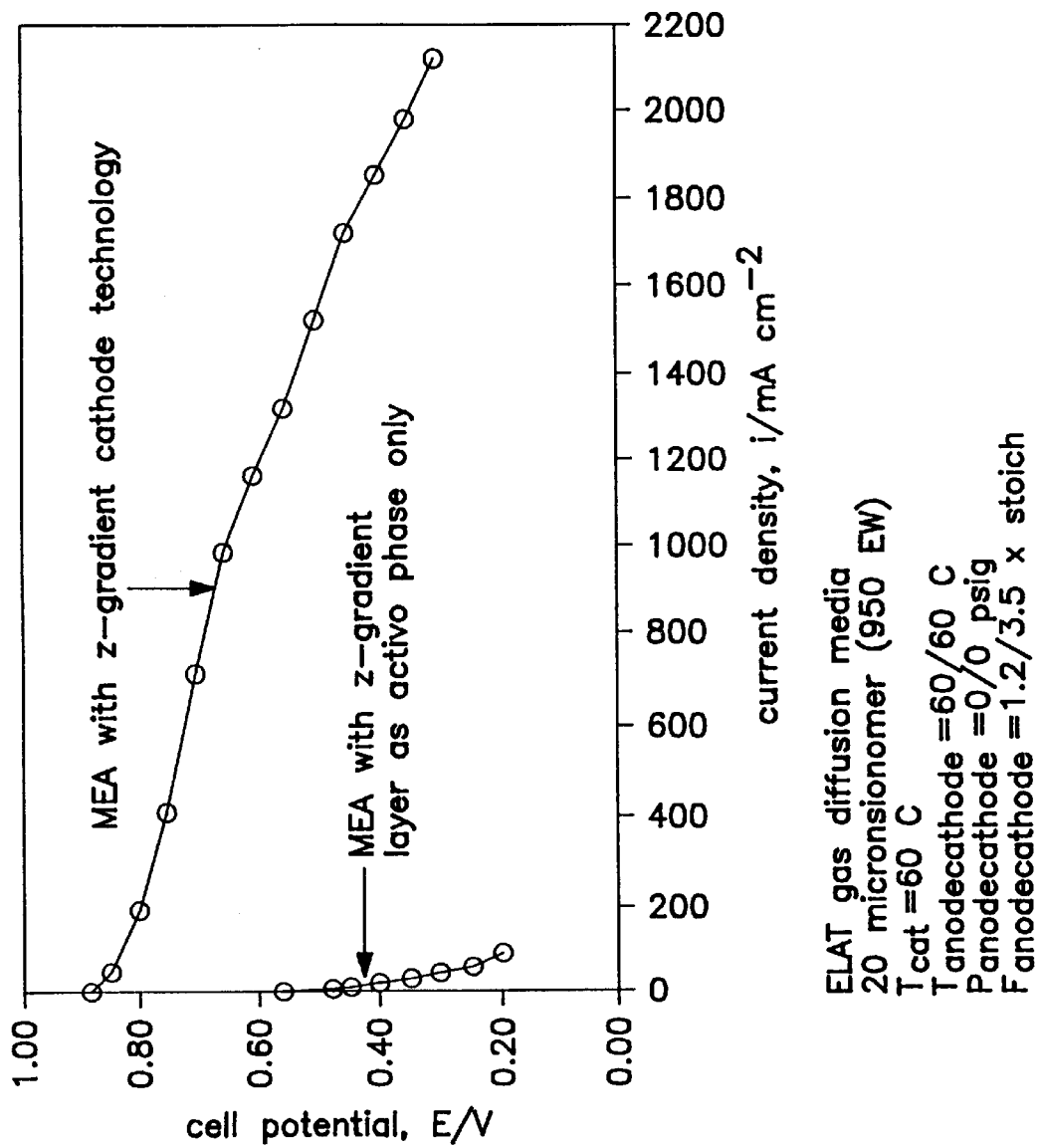
FIG. 14 is an I–V analysis of an MEA with a z-gradient cathode (Example 5) compared against a reference MEA.

FIG. 14 shows the performance of the first and second MEAs. The difference in performance observed between the two MEAs indicates that the 50 Å layer presents low activity in itself at this low loading, but its presence at the interface between the electrocatalyst layer and membrane produces a power improvement and improves the electrode current density profile.

FE-SEM Analysis

Figure 15:
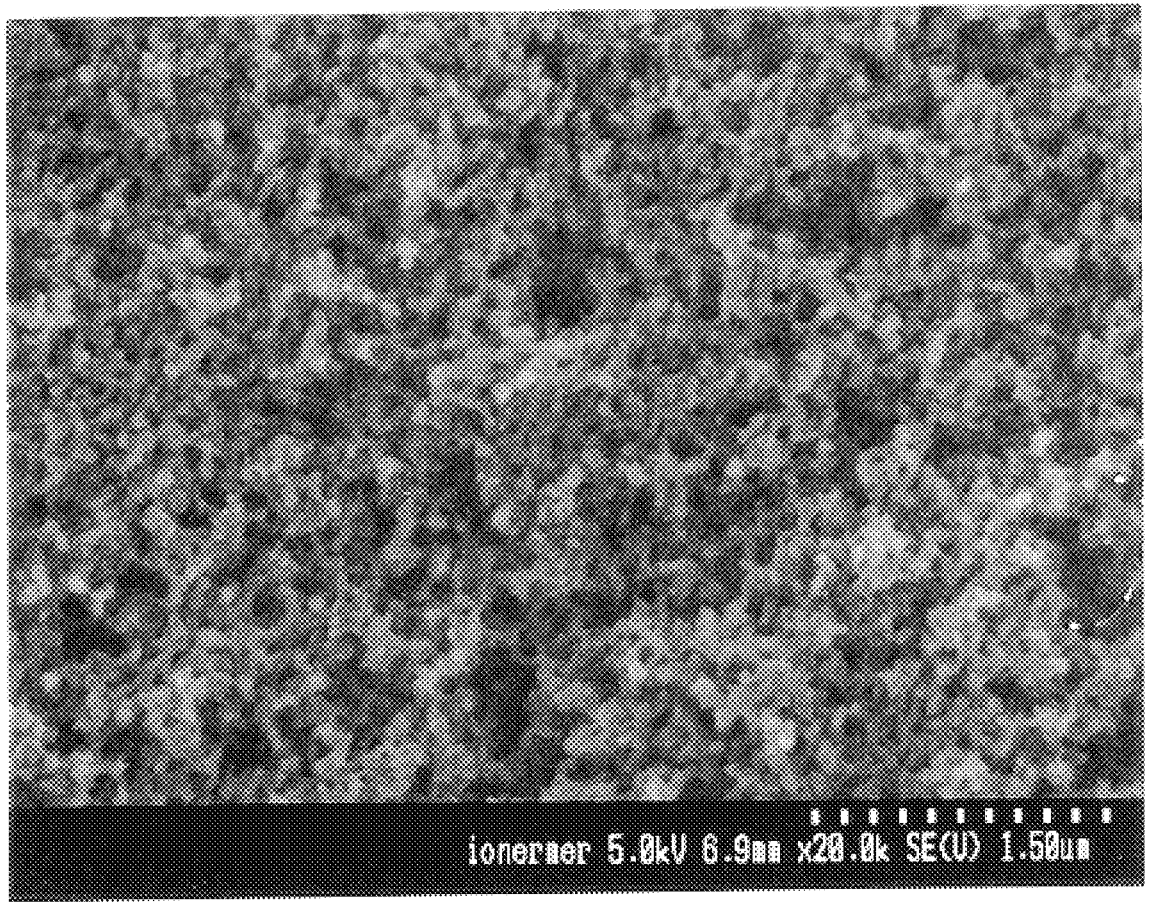
FIG. 15 is a field-emission scanning electron microscope (FE-SEM) analysis of a reference electrode material having catalyst but no vacuum-deposited z-gradient zone.
Figure 16:
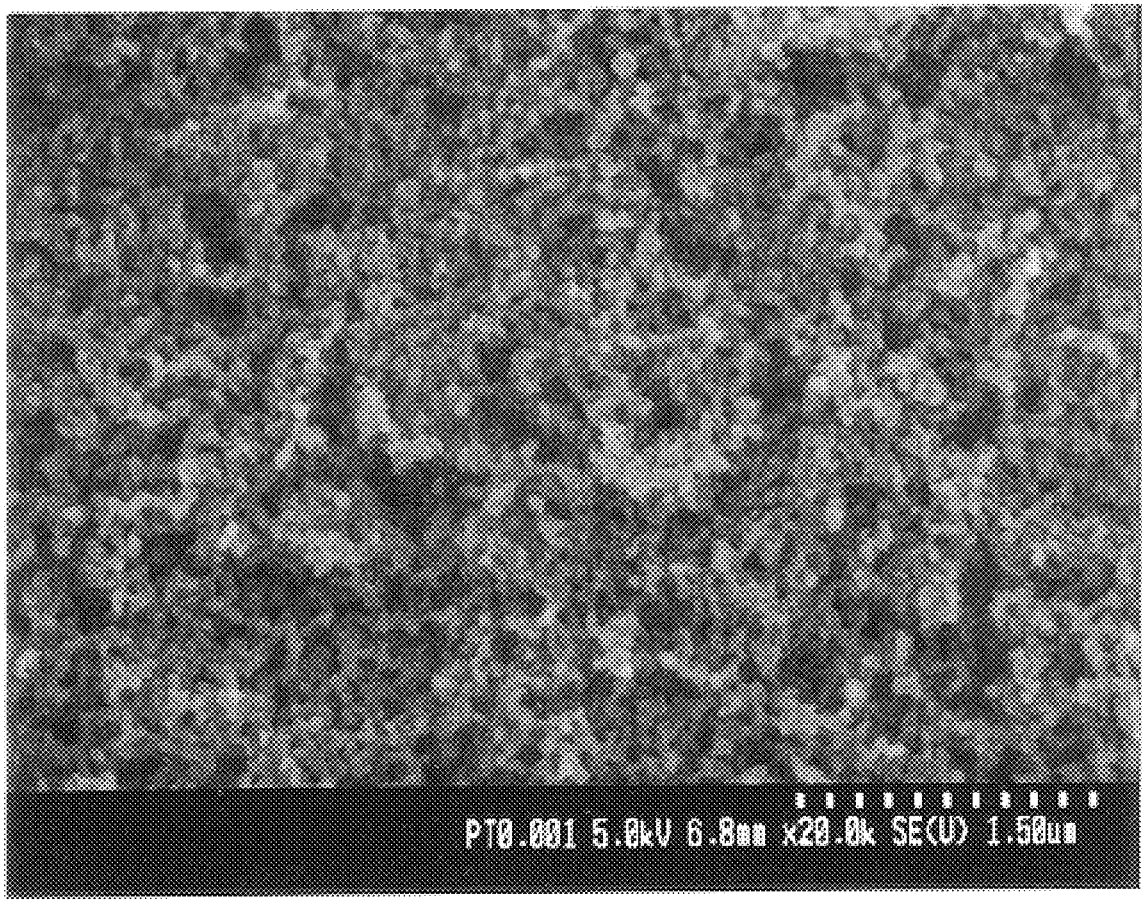
FIG. 16 is an FE-SEM analysis of an electrode having both catalyst and a 5 angstrom (0.001 mg Pt/$cm^2$) loading of the z-gradient zone.
Figure 17:
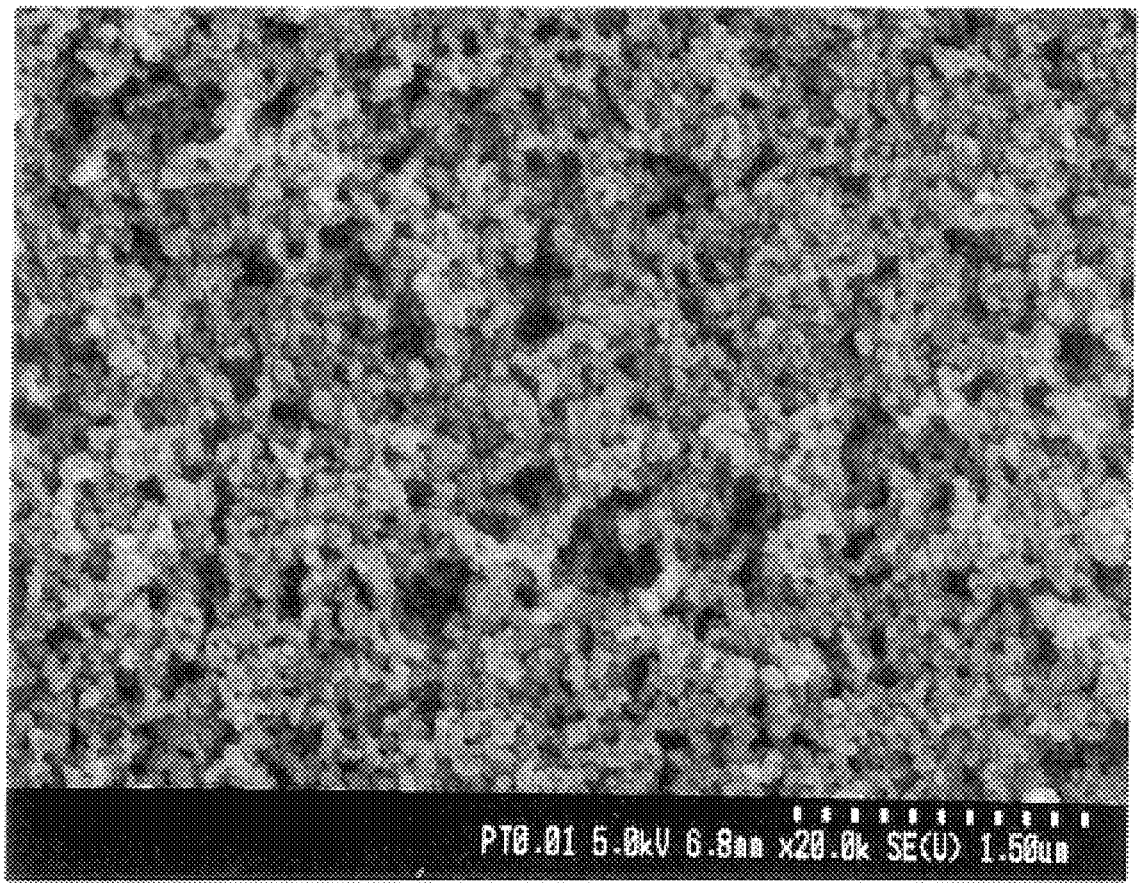
FIG. 17 is an FE-SEM analysis of an electrode having both catalyst and a 50 angstrom (0.01 mg Pt/$cm^2$) loading of the z-gradient zone.
Figure 18:
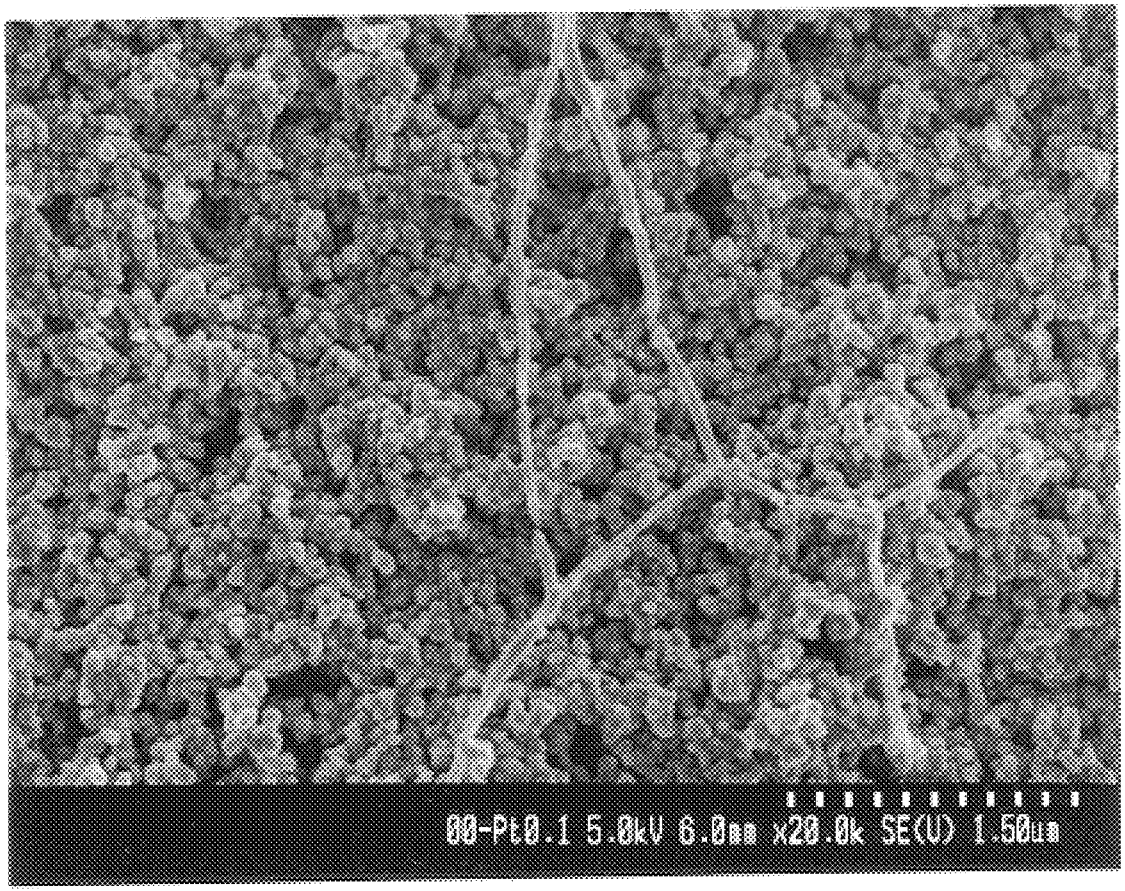
FIG. 18 is an FE-SEM analysis of a 500 angstrom (0.1 mg Pt/$cm^2$) loading of the z-gradient zone.

FE-SEM analyses were carried out for one comparative sample of an electrode with no zone present (FIG. 15) and for 3 samples with different zone thicknesses deposited onto the electrode (FIGS. 16–18). For FIGS. 15–18, the magnification was 20kX and the electron beam energy was 2 keV. The analyses showed relatively uniform zone deposition with FIGS. 15–18 being representative. In general, the microstructure was represented by a combined spherical nodular and whisker morphology, with the latter evidenced at loadings of about 0.1 mg/cm$^2$ (500 Å) (FIG. 18).

FIG. 15 was taken from a sample of the cathode used in Example 2 with 0.1 mg/cm$^2$ Pt loading but without deposition of the second catalytically active metal. FIG. 15 demonstrates the electrode porosity, which allows for reactant diffusion, before deposition of the second catalytically active metal.

FIG. 16 was taken from a sample of the Example 2 cathode with a 0.1 mg/cm$^2$ Pt loading but with a 5 Å zone deposition (0.001 mg/cm$^2$) by EB-PVD. A small but measurable increase in field brightness was evident in FIG. 16 compared with the FIG. 15 control. The increased brightness was uniform across the Figure which suggested an evenly deposited platinum zone. The electrode remained porous and open to reactant diffusion despite the deposition.

FIG. 17 was taken from a sample of the Example 2 cathode with a 0.1 mg/cm$^2$ Pt loading but with a 50 Å zone deposition (0.01 mg/cm$^2$) by EB-PVD. A further increase in field brightness was observed compared with FIG. 16. Spherical platinum nodules were present with diameter widths between about 30 and about 70 nm, and generally about 50 nm. The electrode remained porous and open to reactant diffusion despite the deposition.

FIG. 18 was taken from a sample of the electrode similar to that of Example 2 but with no Pt loading before the deposition. The electrode was then provided with a 500 Å Pt zone by EB-PVD. Again, spherical platinum nodules were present with diameter widths between about 25 nm and about 100 nm, and more particularly, about 30 nm and about 70 nm, and generally about 50 nm. In addition, however, rod-shaped structures were also present. The width diameter of these rods was about 20 nm to about 60 nm, and generally, about 40 nm. The electrode remained porous and open to reactant diffusion despite the deposition.

Data Summary

Data from these examples are summarized below:

| Example number | Zone thickness (Å) | Pressure (psig) | Percent increase in current at 0.6 V compared to reference MEA |
|---|---|---|---|
| 1 | 50 | 0 | 46 |
| 1 | 50 | 15 | 33 |
| 2 | 50 | 0 | 92 |
| 2 | 5 | 0 | 113 |
| 2 | 5 | 15 | 95 |
| 3 | 50 | 0 | 28 |
| 3 | 50 | 15 | 13 |

The foregoing description of preferred embodiments of the invention have been presented for purposes of illustration and description. It is not intended to be exhaustive or to limit the invention to the precise form disclosed. Hence, many modifications and variations are possible in light of the above teaching.

What is claimed is:

1. An electrode-membrane combination comprising:
   at least one reactant diffusive, electronically conductive electrode comprising at least one first catalytically active metal and at least one ionically conductive polymer; and
   at least one ionically conductive membrane combining with the electrode to form an electrode-membrane interfacial region,
   wherein the interfacial region comprises at least one zone comprising at least one second catalytically active metal and having a zone thickness of about 3 angstroms to about 475 angstroms.

2. A combination according to claim 1, wherein the electrode comprises at least one first catalytically active metal and the zone comprises at least one second catalytically active metal, which are the same metals.

3. A combination according to claim 1, wherein the combination comprises a z-gradient step concentration of the first catalytically active metal and the second catalytically active metal.

4. A combination according to claim 1, wherein the second catalytically active metal is in a form which includes substantially spherical nodules having width of about 30 nm to about 70 nm.

5. A combination according to claim 4, wherein the zone thickness is about 5 angstroms to about 250 angstroms.

6. A combination according to claim 4, wherein the zone thickness is about 5 angstroms to about 50 angstroms.

7. A combination according to claim 1, wherein the zone thickness is about 5 angstroms to about 250 angstroms.

8. A combination according to claim 1, wherein the zone thickness is about 5 angstroms to about 50 angstroms.

9. A combination according to claim 1, wherein the first catalytically active metal has a particle size between about 20 angstroms and about 50 angstroms.

10. A combination according to claim 1, wherein the zone comprises at least two different second catalytically active metals.

11. A combination according to claim 1, wherein the electrode comprises at least two different first catalytically active metals.

12. A combination according to claim 1, wherein the electrode further comprises carbon which supports the first catalytically active metal.

13. A combination according to claim 1, wherein the electrode has a loading of first catalytically active metal which is between about 0.01 mg/cm$^2$ and about 1 mg/cm$^2$.

14. A combination according to claim 1, wherein the electrode has a loading of first catalytically active metal which is between about 0.02 mg/cm$^2$ and about 0.5 mg/cm$^2$.

15. A combination according to claim 1, wherein the electrode has a loading of first catalytically active metal which is between about 0.05 mg/cm$^2$ and about 0.4 mg/cm$^2$.

16. A combination according to claim 1, wherein the electrode has a loading of first catalytically active metal which is less than about 0.3 mg/cm$^2$.

17. A combination according to claim 1, wherein both the electrode and the zone comprise platinum.

18. A combination according to claim 1, wherein the ionically conductive membrane comprises an ionically conductive polymer which is substantially the same as the ionically conductive polymer of the electrode.

19. A combination according to claim 1, wherein the electrode further comprises at least one solvent.

20. A combination according to claim 1, wherein the membrane has a thickness about 3 microns to about 75 microns.

21. A combination according to claim 20, wherein the membrane has a Gurley number greater than 10,000 seconds.

22. A combination according to claim 1, wherein the membrane has a thickness less than about 50 microns.

23. A combination according to claim 22, wherein the membrane comprises a porous polymer impregnated with a fluoroionomer.

24. A combination according to claim 23, wherein the porous polymer is expanded polytetrafluoroethylene and the fluoroionomer is a sulfonated perfluoroionomer.

25. A combination according to claim 24, wherein the electrode has a loading of the first catalytically active metal less than about 0.3 mg/cm$^2$.

26. A combination according to claim 1, wherein the membrane has a thickness less than about 30 microns.

27. A combination according to claim 1, wherein the electrode is a first electrode, and the assembly further comprises a second electrode combining with the membrane on a membrane side opposite to the first electrode, wherein the second electrode also comprises at least one first catalytically active metal and at least one ionically conductive polymer.

28. A combination according to claim 27, wherein the second electrode has a metal loading less than about 0.3 mg/cm$^2$.

29. A combination according to claim 27, wherein the combination has a catalyst mass activity of at least 5,000 mA/mg.

30. A combination according to claim 27, wherein the second electrode combines with the membrane to form a second electrode-membrane interfacial region, this second region comprising at least one zone comprising at least one second catalytically active metal and having a zone thickness of about 3 angstroms to about 475 angstroms.

31. A combination according to claim 1, wherein the electrode comprises at least one first catalytically active metal and the zone comprises at least one second catalytically active metal, which are the same metals; wherein the zone thickness is about 5 angstroms to about 50 angstroms;
wherein the electrode further comprises polytetrafluoroethylene and carbon which supports the first catalytically active metal;
wherein the electrode loading of first catalytically active metal is less than about 0.3 mg/cm$^2$;
wherein the membrane has a thickness less than about 30 microns and comprises a porous polymer impregnated with a fluoroionomer; and
the membrane has a Gurley number greater than 10,000 seconds.

32. A membrane electrode assembly comprising the electrode-membrane combination according to claim 1.

33. An electrode-membrane combination comprising:
at least one electronically conducting electrode comprising at least one first catalytically active metal and at least one ionically conductive polymer; and
at least one ionically conducting membrane combining with the electrode to form an electrode-membrane interfacial region, wherein the interfacial region comprises a vacuum deposited zone comprising at least one second catalytically active metal,
wherein the zone has a zone thickness of about 3 angstroms to about 475 angstroms.

34. A combination according to claim 33, wherein the membrane comprises at least one fluorinated polymer support and at least one ionically conductive fluorinated polymer.

35. A combination according to claim 33, wherein the membrane has a Gurley number greater than about 10,000 seconds.

36. A combination according to claim 33, wherein the membrane has a thickness less than about 30 microns.

37. A combination according to claim 33, wherein the vacuum deposited zone is deposited by initial vacuum deposition of the second catalytically active metal onto a support other than the electrode or membrane, followed by transfer of the deposited second catalytically active metal from the support to the membrane.

38. A combination according to claim 33, wherein the vacuum deposited zone is deposited by vacuum deposition of the second catalytically active metal onto the electrode.

39. A combination according to claim 33, wherein the vacuum deposited zone is deposited by vacuum deposition of the second catalytically active metal onto the membrane.

40. A combination according to claim 33, wherein the vacuum deposited zone is deposited by chemical vapor deposition, physical vapor deposition, thermal deposition, cathodic arc deposition, ion sputtering, ion beam assisted deposition, or jet vapor deposition.

41. A combination according to claim 33, wherein the vacuum deposited zone is deposited by physical vapor deposition or sputtering.

42. A combination according to claim 33, wherein the vacuum deposited zone is deposited by electron beam physical vapor deposition.

43. A combination according to claim 33, wherein the zone has a zone thickness between about 5 angstroms and about 250 angstroms.

44. A combination according to claim 33, wherein the zone has a zone thickness between about 5 angstroms and about 50 angstroms.

45. A combination according to claim 33, wherein the electrode has a loading of first catalytically active metal of between about, 0.02 mg/cm$^2$ and about 0.5 before the vacuum deposited zone is deposited.

46. A combination according to claim 33, wherein the electrode has a loading of first catalytically active metal less than about 0.3 mg/cm$^2$ before the vacuum deposited zone is deposited.

47. A combination according to claim 33, wherein the combination comprises a z-gradient step concentration of the first and second catalytically active metals.

48. A combination according to claim 33, wherein the electrode further comprises polytetrafluoroethylene.

49. A combination according to claim 33, a wherein the vacuum deposited zone is deposited with movement of a deposition substrate to provide substantial zone uniformity to the vacuum deposited zone.

50. A combination according to claim 33, wherein the interfacial region comprises a vacuum deposited zone of at least two second catalytically active metals.

51. A combination according to claim 33, wherein the second catalytically active metal is in a form which includes substantially spherical nodules.

52. A combination according to claim 51, wherein the nodules are characterized by a width of between about 30 nm and about 70 nm.

53. A combination according to claim 51, wherein the form also includes rod-shaped structures.

54. A combination according to claim 53, wherein the rod-shaped structures have a rod width between about 20 nm and about 100 nm.

55. A combination according to claim 32, wherein the membrane comprises at least one fluorinated polymer support and at least one ionically conductive fluorinated polymer;
wherein the membrane has a thickness between about 3 microns and about 75 microns;
wherein the membrane has a Gurley number greater than about 10,000 seconds;
wherein the vacuum deposited zone is deposited by electron beam physical vapor deposition;
wherein the electrode has a loading of first catalytically active metal less than about 0.3 mg/cm$^2$ before the vacuum deposited zone is deposited.

56. A membrane electrode assembly comprising the electrode-membrane combination according to claim 3.

57. An electrode-membrane combination comprising:
at least one reactant diffusive, electronically conducting electrode comprising (i) at least one first catalytically active metal dispersed throughout the electrode; (ii) at least one jonically conductive polymer, and (iii) a vacuum deposited zone comprising at least one second catalytically active metal;
an ionically conducting membrane contacting the electrode to form an electrode-membrane interface, wherein the zone of at least one second catalytically active metal is concentrated in the electrode at the electrode-membrane interface,
wherein the vacuum deposited zone has a thickness between about 3 angstroms and about 475 angstroms.

58. A combination according to claim 57, wherein the electrode comprises at least one first catalytically active metal, and the zone comprises at least one second catalytically active metal, which are the same metals.

59. A combination according to claim 57, wherein the second catalytically active metal is characterized by a form which includes substantially spherical nodules with a width diameter between about 25 nm and about 100 nm.

60. A combination according to claim 57, wherein the vacuum deposited zone has a thickness between about 5 angstroms and about 250 angstroms.

61. A combination according to claim 57, wherein the vacuum deposited zone has a loading of second catalytically active metal between about 0.0007 mg/cm$^2$ and about 0.09 mg/cm$^2$.

62. A combination according to claim 57, wherein the electrode thickness is between about 3 microns and about 30 microns.

63. A combination according to claim 57, wherein the membrane has a thickness between about 3 microns and about 75 microns and an ionic conductance of at least about 8.5 mho/cm$^2$.

64. A combination according to claim 57, wherein the membrane has a Gurley number greater than 10,000 seconds, a thickness less than 30 microns, and an ionic conductance of at least 22 mhos/cm$^2$.

65. A combination according to claim 57, wherein the membrane has a Gurley number greater than 10,000 seconds, a thickness less than 30 microns, and an ionic conductance of at least 22 mhos/cm$^2$.

66. A membrane electrode assembly comprising the electrode-membrane combination according to claim 52.

67. An article comprising:
at least one reactant diffusive, electronically conductive electrode comprising at least one first catalytically active metal and at least one ionically conductive polymer; and
at least one ionically conductive membrane combining with the electrode to form an electrode-membrane interfacial region,
wherein the interfacial region comprises at least one zone comprising at least one second catalytically active metal and having a zone loading of about 0.0006 mg/cm$^2$ to about 0.12 mg/cm$^2$,
wherein the zone has a zone thickness between about 3 angstroms and about 475 angstroms.

68. An article according to claim 67, wherein the electrode comprises at least one first catalytically active metal and the zone comprises at least one second catalytically active metal which are the same metals.

69. An article according to claim 67, wherein the zone has a zone thickness between about 5 angstroms and about 250 angstroms.

70. An article according to claim 67, wherein the zone of second catalytically active metal is deposited by chemical vapor deposition, physical vapor deposition, thermal deposition, cathodic arc deposition, ion sputtering, ion beam assisted deposition, or jet vapor deposition.

71. An article according to claim 67, wherein the zone of second catalytically active metal is deposited by physical vapor deposition or magnetron sputtering.

72. An article according to claim 67, wherein the zone of second catalytically active metal is deposited by electron beam physical vapor deposition.

73. An article according to claim 67, wherein the second catalytically active metal is characterized by substantially spherical nodules having diameter between about 25 nm and 100 nm.

74. An article according to claim 67, wherein the zone loading is between about 0.001 mg/cm$^2$ and about 0.05 mg/cm$^2$.

75. An article according to claim 67, wherein the zone loading is between about 0.005 mg/cm$^2$ and about 0.02 mg/cm$^2$.

76. An article according to claim 67, wherein the electrode has an electrode thickness between about 3 microns and about 30 microns.

77. An article according to claim 67, wherein the electrode has a loading of first catalytically active metal between about 0.02 mg/cm$^2$ and about 0.5 mg/cm$^2$.

78. An article according to claim 67, wherein the membrane has a thickness between about 3 microns and about 75 microns.

79. An article according to claim 77, wherein the membrane has a thickness between about 3 microns and about 50 microns;
wherein the electrode has an electrode thickness between about 3 microns and about 30 microns; and
wherein the zone of second catalytically active metal is deposited by electron beam physical vapor deposition.

80. A membrane electrode assembly comprising the article according to claim 67.

81. An electrode-membrane combination comprising:
at least one reactant diffusive, electronically conductive electrode comprising at least one
first catalytically active metal and at least one ionically conductive polymer; and
at least one ionically conductive membrane combining with the electrode to form an electrode-membrane interfacial region,
wherein the interfacial region comprises at least one zone comprising at least one second catalytically active metal having a form including substantially spherical nodules,
wherein the thickness of the zone is between about 3 angstroms and about 475 angstroms.

82. A combination according to claim 81, wherein the nodules have a width diameter between about 25 nm and about 100 nm.

83. A combination according to claim 82, wherein the thickness of the zone is between about 5 angstroms and about 50 angstroms.

84. A combination according to claim 81, wherein the nodules have a width diameter between about 30 nm and 70 nm.

85. A combination according to claim 81, wherein the thickness of the zone is between about 5 angstroms and about 250 angstroms.

86. A combination according to claim 81, wherein the thickness of the zone is between about 5 angstroms and about 50 angstroms.

87. A combination according to claim 81, wherein the loading of second catalytically active metal is between about 0.0007 mg/cm$^2$ and about 0.09 mg/cm$^2$.

88. A combination according to claim 81, wherein the loading of second catalytically active metal is between about 0.001 mg/cm$^2$ and about 0.05 mg/cm$^2$.

89. A combination according to claim 81, wherein the loading of second catalytically active metal is between about 0.005 mg/cm$^2$ and about 0.02 mg/cm$^2$.

90. A combination according to claim 81, wherein the electrode has a thickness between about 3 microns and about 30 microns.

91. A combination according to claim 81, wherein the loading of the first catalytically active metal is between about 0.02 mg/cm$^2$ and about 0.5 mg/cm$^2$.

92. A combination according to claim 91, wherein the membrane has a thickness less than about 30 microns.

93. A combination according to claim 81, wherein the membrane has a thickness between about 3 microns and about 75 microns.

94. A combination according to claim 81, wherein the zone is deposited by chemical vapor deposition, physical vapor deposition, thermal deposition, cathodic arc deposition, ion sputtering, ion beam assisted deposition, or jet vapor deposition.

95. A combination according to claim 81, wherein the zone is deposited by electron beam physical vapor deposition;
wherein the thickness of the zone is between about 5 angstroms and about 50 angstroms;
wherein the loading of the first catalytically active metal is between about 0.02 mg/cm$^2$ and about 0.5 mg/cm$^2$;
wherein the membrane has a Gurley number greater than 10,000 seconds;
wherein the membrane comprises a porous polymer impregnated with a fluoroionomer; and
wherein the membrane has a thickness less than about 30 microns.

96. A membrane electrode assembly comprising the combination of:
first and second reactant diffusive, electronically conducting electrodes, and
at least one ionically conducting membrane sandwiched between and combining with the first and second electrodes to form first and a second membrane-electrode interfacial regions, respectively,
wherein the first and second electrodes each comprise at least one ionically conductive polymer and at least one catalytically active first metal, and
wherein at least one of the two interfacial regions comprises a zone of at least one catalytically active second metal having a zone loading between about 0.0006 mg/cm$^2$ and about 0.12 mg/cm$^2$,
wherein the zone has a zone thickness between about 3 angstroms and about 475 angstroms.

97. A membrane electrode assembly according to claim 96, wherein both first and second interfacial regions comprise a zone of catalytically active second metal having a zone thickness between about 3 angstroms and about 475 angstroms.

98. A membrane electrode assembly according to claim 96, wherein the zone thickness is between about 5 angstroms and about 250 angstroms.

99. A membrane electrode assembly according to claim 96, wherein the assembly has a catalyst mass activity of greater than about 2,500 mA/mg.

100. A membrane electrode assembly according to claim 96, wherein the assembly has a catalyst mass activity of greater than about 5,000 mA/mg.

101. A membrane electrode assembly according to claim 96, wherein the first and second electrodes each have loadings of first catalytically active metal between about 0.02 mg/cm$^2$ and about 0.5 mg/cm$^2$.

102. A membrane electrode assembly according to claim 96, wherein the assembly provides an R ratio greater than 1, the R ratio being the percent increase, when the zone is present, in current density at 0.6 V divided by the zone thickness in angstroms.

103. A membrane electrode assembly according to claim 102, wherein the R ratio is greater than 10.

104. A membrane electrode assembly according to claim wherein the R ratio is greater than 20.

105. A membrane electrode assembly according to claim 94, wherein the membrane has a thickness less than about 30 microns.

106. A membrane electrode assembly according to claim 96, wherein the second catalytically active metal has a form including substantially spherical nodular structures.

107. A membrane electrode assembly according to claim 106, wherein the nodular structures are characterized by width diameter between about 25 nm and about 100 nm.

108. A membrane electrode assembly according to claim 96, wherein the zone is deposited by chemical vapor deposition, physical vapor deposition, thermal deposition, cathodic arc deposition, ion sputtering, ion beam assisted deposition, or jet vapor deposition.

109. A membrane electrode assembly according to claim 95, wherein the zone is deposited by electron beam physical vapor deposition.

110. A membrane electrode assembly according to claim 96, wherein the zone is deposited by electron beam physical vapor deposition;
- wherein the membrane has a thickness less than about 30 microns and a Gurley number greater than 10,000 seconds;
- wherein the membrane comprises at least one fluorinated polymer support and at least one ionically conductive fluorinated polymer; and
- wherein the electrode further comprises carbon which supports the first catalytically active metal.

111. A fuel cell stack comprising a plurality of electronically connected membrane electrode assemblies according to claim 96.

112. A transportation vehicle comprising the fuel cell stack according to claim 111.

113. A membrane electrode assembly comprising the combination of
- first and second reactant diffusive, electronically conducting electrodes, and
- at least one ionically conducting membrane sandwiched between and combining with the first and second electrodes to form first and a second membrane-electrode interfacial regions, respectively,
- wherein the first and second electrodes each comprise ionically conductive polymer and at least one catalytically active first metal, and
- wherein at least one of the two interfacial regions comprise a zone of catalytically active second metal having a form including substantially spherical nodules,
- wherein the zone has a zone thickness between about 3 angstroms and about 475 angstroms.

114. A membrane electrode assembly according to claim 113, wherein the zone has a zone thickness between about 5 angstroms and about 250 angstroms.

115. A membrane electrode assembly according to claim 113, wherein the zone has a zone thickness between about 5 angstroms and about 50 angstroms.

116. A membrane electrode assembly according to claim 113, wherein the zone has a zone loading between about 0.0007 mg/cm$^2$ and about 0.09 mg/cm$^2$.

117. A membrane electrode assembly according to claim 113, wherein the zone has a zone loading between about 0.001 mg/cm$^2$ and about 0.05 mg/cm$^2$.

118. A membrane electrode assembly according to claim 113, wherein the membrane has thickness between about 3 microns and about 75 microns.

119. A membrane electrode assembly according to claim 113, wherein the zone is deposited by electron beam physical vapor deposition;
- wherein the membrane has a thickness less than about 30 microns and a Gurley number greater than 10,000 seconds;
- wherein the membrane comprises at least one fluorinated polymer support and at least one ionically conductive fluorinated polymer;
- wherein the first and second catalytically active metals are platinum; and
- wherein the electrode further comprises carbon which supports the first catalytically active metal.

120. A membrane electrode assembly according to claim 113, wherein the assembly has a total catalyst loading of less than about 0.65 mg/cm$^2$.

121. A membrane electrode assembly according to claim 113, wherein the assembly has a total catalyst loading of less than about 0.2 mg/cm$^2$.

122. A membrane electrode assembly according to claim 113, wherein the membrane comprises a base material having a porosity between 70% and 95% before an impregnation of the base material with an ionically conductive polymer.

123. A membrane electrode assembly according to claim 113, wherein the membrane comprises a base material having an average pore size of about 0.05 microns to about 0.4 microns before an impregnation of the base material with an ionically conductive polymer.

124. A membrane electrode assembly according to claim 113, wherein the zone is deposited by combustion chemical vapor deposition.

125. A membrane electrode assembly according to claim 113, wherein the first and second electrodes further comprise and are prepared with a polytetrafluoroethylene support.

126. A membrane electrode assembly according to claim 125, wherein the support has a pore volume of about 60% to about 90%.

127. A membrane electrode assembly according to claim 125, wherein the support has a maximum pore size between about 0.05 kg/cm$^2$ and about 0.5 kg/cm$^2$.

128. A fuel cell stack comprising a plurality of electronically connected membrane electrode assemblies according to claim 113.

129. A transportation vehicle comprising the fuel cell stack according to claim 128.

130. A method of improving the power output of a fuel cell membrane electrode assembly comprising the combination of steps of:
- providing assembly elements including (i) at least one reactant diffusive, electronically conductive electrode comprising at least one ionically conductive polymer and at least one first catalytically active metal dispersed throughout the electrode, and (ii) at least one ionically conductive membrane;
- depositing onto at least one of the assembly elements a zone of at least one second catalytically active metal having a zone thickness between about 3 angstroms and about 475 angstroms, wherein the zone deposition is (i) a direct deposition onto the assembly element, or (ii) an indirect deposition onto the assembly element wherein the deposited zone is first deposited onto a substrate and then transferred from the substrate onto the assembly element, and
- optionally, assembling the membrane electrode assembly from the assembly elements.

131. A method according to claim 130, wherein the assembly element is the ionically conductive membrane.

132. A method according to claim 131, wherein the zone comprises metal having a form of substantially spherical nodules.

133. A method according to claim 132, wherein the nodules have a width diameter between about 25 nm and about 100 nm.

134. A method according to claim 130, wherein the assembly element is the electrode.

135. A method according to claim 130, wherein the substrate is a perfluorinated polymer.

136. A method according to claim 130, wherein the zone thickness is between about 5 angstroms and about 250 angstroms.

137. A method according to claim 130, wherein the zone thickness is between about 5 angstroms and about 50 angstroms.

138. A method according to claim 130, wherein the membrane has a thickness between about 3 microns and about 75 microns.

139. A method according to claim 130, wherein the membrane comprises at least one porous polymeric support in which an ionically conductive polymer is impregnated to provide a membrane burley number greater than 10,000 seconds.

140. A method according to claim 139, wherein the membrane has a thickness less than about 50 microns.

141. A method according to claim 139, wherein the membrane has a thickness less than about 30 microns.

142. A method according to claim 130, wherein the deposition is chemical vapor deposition, physical vapor deposition, thermal deposition, cathodic arc deposition, ion sputtering, ion beam assisted deposition, or jet vapor deposition.

143. A method according to claim 130, wherein the deposition is a physical vapor deposition or a sputtering.

144. A method according to claim 132, wherein the deposition is an electron beam physical vapor deposition.

* * * * *